(12) United States Patent
Kato et al.

(10) Patent No.: US 11,076,339 B2
(45) Date of Patent: Jul. 27, 2021

(54) WIRELESS COMMUNICATION SYSTEM, WIRELESS COMMUNICATION METHOD, AND BASE STATION

(71) Applicant: Panasonic Intellectual Property Management Co., Ltd., Osaka (JP)

(72) Inventors: Osamu Kato, Fukuoka (JP); Hideki Kanemoto, Kanagawa (JP); Hiroaki Asano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 69 days.

(21) Appl. No.: 16/581,022

(22) Filed: Sep. 24, 2019

(65) Prior Publication Data

US 2020/0260357 A1 Aug. 13, 2020

(30) Foreign Application Priority Data

Feb. 8, 2019 (JP) ............................. JP2019-021605

(51) Int. Cl.
*H04W 40/12* (2009.01)
*H04W 92/04* (2009.01)
*H04W 40/24* (2009.01)
*H04W 24/10* (2009.01)

(52) U.S. Cl.
CPC .......... *H04W 40/12* (2013.01); *H04W 24/10* (2013.01); *H04W 40/248* (2013.01); *H04W 92/045* (2013.01)

(58) Field of Classification Search
CPC .... H04W 24/10; H04W 40/12; H04W 92/045
See application file for complete search history.

(56) References Cited

U.S. PATENT DOCUMENTS

| 2013/0142136 | A1* | 6/2013 | Pi | H04B 7/1555 370/329 |
|---|---|---|---|---|
| 2018/0049190 | A1* | 2/2018 | Abedini | H04L 1/0001 |
| 2020/0015295 | A1* | 1/2020 | Stauffer | H04B 7/15528 |
| 2020/0383148 | A1* | 12/2020 | Takeda | H04W 76/10 |

OTHER PUBLICATIONS

PicoCELA Inc., "A Wireless Backhaul Prototype with Capability of Over 10 Hops Relay," *White Paper*, [Retrieved on Feb. 6, 2019], 10 pages.

\* cited by examiner

*Primary Examiner* — Jamal Javaid
*Assistant Examiner* — Ryan C Kavleski
(74) *Attorney, Agent, or Firm* — Seed IP Law Group LLP

(57) ABSTRACT

A wireless communication system includes a first base station connectable to a backbone network by a wireless backhaul, and a path generator generating a wireless multi-hop path including the first base station and one or more second base stations connected to the first base station by a wireless multi-hop. The first base station reports a measurement result of a line quality of the wireless backhaul and a measurement result of a line quality between the first base station and the second base station disposed around the first base station. The first base station is switched to a first mode connected to the backbone network by the wireless backhaul or to a second mode connected to the second base station by a wireless multi-hop, in response to the path signal.

18 Claims, 11 Drawing Sheets

WIRELESS COMMUNICATION SYSTEM, WIRELESS COMMUNICATION METHOD, AND BASE STATION

BACKGROUND

1. Technical Field

The present disclosure relates to a wireless communication system, a wireless communication method, and a base station that relay and transmit a data signal from a wireless terminal.

2. Description of the Related Art

In order to increase a system capacity (for example, a capacity represented as a unit such as bps/km$^2$) of a wireless communication system, installing a large number of base stations in an area at a high density is said to be one solution (for example, refer to a base station of a small cell). Particularly, a radius of cell that can be covered by a base station corresponding to a millimeter wave band or a quasi-millimeter wave band to which a high frequency band of Wifi (registered trademark) or 5G (fifth generation mobile communication method) can be applied, is small. For example, it is said that a radius of Wifi (registered trademark) is approximately 50 m [meter] and a radius of 5G is approximately 20 to 200 m [meters]. Accordingly, it is necessary to install many base stations in the area to be covered so as to expand the coverage area of the wireless communication system as well as increase a system capacity of the wireless communication system.

However, selecting a location of installation (so-called station installation) of the base station is a complicated and huge work requiring negotiation with an area owner. The major factor is a wiring work of a backhaul line which is a line between the base station and a backbone network (for example, the Internet, a mobile communication core network). The backhaul line mainly includes the Ethernet (registered trademark) which uses an optical fiber line or a twisted pair cable, but securing this wiring path causes a station installation work to be very complicated and huge.

In response to such circumstances, a technology for making a backhaul line of a wireless communication system having a small cell base station wireless is attempted. As an example, a technology (wireless multi-hop communication) for installing only the backhaul line of a part (a core node base station) of the base stations using a wire line (for example, an optical fiber line) and for relaying the backhaul lines of the remaining many base stations between the base stations up to the core node base station through a wireless communication in multiple stages is developed. This wireless multi-hop communication is already available for a commercial use (see, for example, (NPTL1) "A Wireless Backhaul Prototype with Capacity of Over10 Hops Relay", White Paper, [online]. PicoCELA Inc., [retrieved on 2019 Feb. 6]. Retrieved from the Internet: <URL: http://fukuoka.shoplog.jp/image/custom/picocela/kiji/whitePaperpdf>). The base stations other than the core node base station are also referred to as relay node base stations, and the relay node base station has both a relay function and an access function for performing air interface connection (hereinafter, also referred to as an "access line") with a terminal such as a smartphone in addition to the relay function.

Here, it is considered that there is the following merit in a method of accommodating a small cell base station of Wifi (registered trademark) or 5G, or the like in a backbone network by using a backhaul line which uses a wireless multi-hop communication. First, a relay node base station of a high ratio (that is, no need to install of the backhaul line of a wire cable) and a core node base station of a low ratio (that is, need to install the backhaul line of the wire cable) can form a wireless communication service area economically (that is, a scale of the wire cable wiring work can be reduced) and quickly. Second, since wiring of the backhaul line through the wire cable is not required when the relay node base station is installed, an installation location can be easily changed. For example, if a multi-hop path can be dynamically reconstructed by a wireless multi-hop communication applied to form a wireless backhaul, the relay node base station can move around a limited area (in other words, an area in which a hop link formation of wireless multi-hop is possible).

However, when a wireless multi-hop communication of NPTL1 is applied, if a ratio of the relay node base stations is too high, a required system capacity of a hop link for transferring a traffic (data signal) to be relayed is increased. Accordingly, there is a problem that a system capacity of the air interface that can be accommodated by a relay node base station group configured with a plurality of relay node base stations is reduced. There is also a problem that a high throughput (bps) hop link is required because a traffic is collected by a wireless interface of more downstream relay node base stations as hop links closer to the core node base station.

SUMMARY

The present disclosure is made in view of the above-described circumstances of related art, and provides a wireless communication system, a wireless communication method, and a base station that adaptively switch a function of a core node base station or a function of a relay node base station according to a quality of a wireless line of a wireless backhaul and a quality of a wireless line to a peripheral base station, and achieve both reduction in installation of a backhaul line of a wire cable and suppression of reduction in system capacity.

The present disclosure provides a wireless communication system including at least one first base station connectable to a backbone network by a wireless backhaul, and a path generator generating a wireless multi-hop path including the first base station and one or more second base stations connected to the first base station by a wireless multi-hop, in which the first base station reports a first quality measurement result indicating a line quality of the wireless backhaul and a second quality measurement result indicating a line quality between the first base station and the second base station disposed around the first base station, to the path generator, the path generator generates a path signal indicating the wireless multi-hop path and transmits the path signal to the first base station, based on the first quality measurement result and the second quality measurement result transmitted from the first base station, and the first base station is switched to a first mode in which the first base station is connected to the backbone network by the wireless backhaul or to a second mode in which the first base station is connected to the second base station disposed therearound by a wireless multi-hop, in response to the path signal.

The present disclosure provides a wireless communication method in a wireless communication system including at least one first base station connectable to a backbone network by a wireless backhaul, and a path generator generating a wireless multi-hop path including the first base station and one or more second base stations connected to the first base station by a wireless multi-hop, and the wireless communication method includes reporting a first quality measurement result indicating a line quality of the wireless backhaul and a second quality measurement result indicating a line quality between the first base station and the second base station disposed around the first base station, to the path generator by using the first base station, generating a path signal indicating the wireless multi-hop path and transmitting the path signal to the first base station by using the path generator, based on the first quality measurement result and the second quality measurement result transmitted from the first base station, and causing the first base station to be switched to a first mode in which the first base station is connected to the backbone network by the wireless backhaul or to a second mode in which the first base station is connected to the second base station disposed therearound by a wireless multi-hop, in response to the path signal.

The present disclosure provides a base station connectable to a backbone network by a wireless backhaul, and the base station includes a first communicator communicating with a path generator generating a wireless multi-hop path including the base station and one or more external base stations connected to the base station by a wireless multi-hop, through the wireless backhaul, a second communicator communicating with the external base station through the wireless multi-hop, a first measurer measuring a first quality indicating a line quality of the wireless backhaul, a second measurer measuring a second quality indicating a line quality between the base station and the external base station, and a controller performing switching to a first mode in which the base station is connected to the backbone network by the wireless backhaul, or to a second mode in which the base station is connected to the external base station by the wireless multi-hop in response to a path signal of the wireless multi-hop path transmitted from the path generator based on each measurement result of the first quality and the second quality.

According to the present disclosure, a function of a core node base station or a function of a relay node base station can be adaptively switched according to a quality of a wireless line of a wireless backhaul and a quality of a wireless line to a peripheral base station, and thus, it is possible to achieve both reduction in installation of a backhaul line of a wire cable and suppression of reduction in system capacity.

DETAILED DESCRIPTION

Hereinafter, embodiments in which a wireless communication system, a wireless communication method, and a configuration and an operation of a base station according to the present disclosure are specifically disclosed will be described in detail with reference to the drawings as appropriate. However, the detailed description more than necessary may be omitted. For example, detailed description of well-known matters and a redundant description on substantially the same configuration may be omitted. This is to avoid an unnecessary redundancy in the following description and to facilitate understanding by those skilled in the art. Accompanying drawings and the following description are provided to enable those skilled in the art to fully understand the present disclosure and are not intended to limit subject matters of claims.

Configuration of Wireless Communication System

Figure 1:
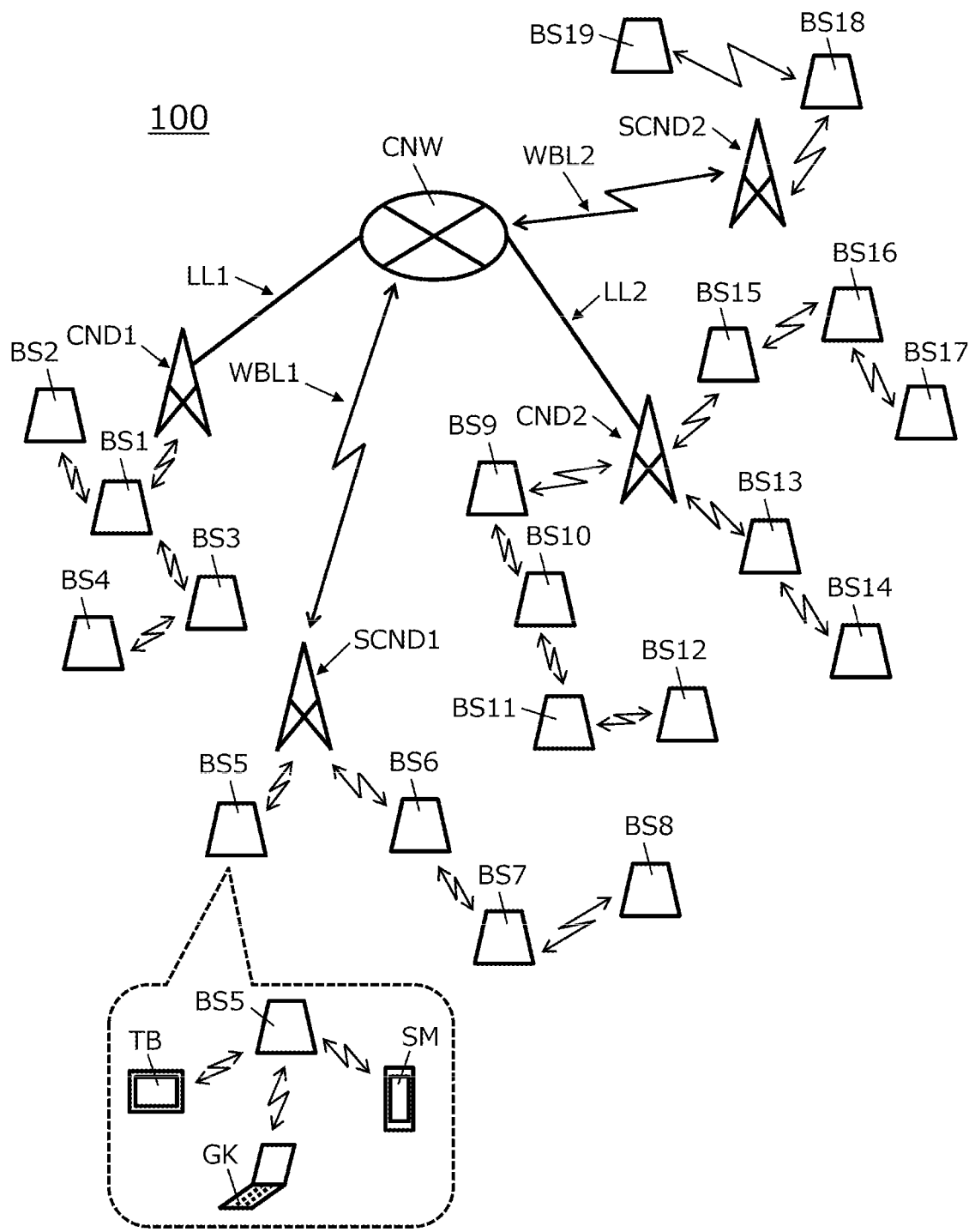
FIG. 1 is a diagram illustrating a system configuration example of a wireless communication system according to a first embodiment.

First, a configuration of wireless communication system 100 according to a first embodiment will be described with reference to FIG. 1. FIG. 1 is a diagram illustrating a system configuration example of wireless communication system 100 according to the first embodiment. For example, a case is assumed in which a scale of an installation work of wire backhaul is reduced as much as possible and a core node ratio cannot be reduced because a peak of a system capacity of wireless communication system 100 which uses a wireless multi-hop communication is large (see FIG. 1), as an application destination of wireless communication system 100 according to the first embodiment. A case may also be applied in which a difference between a peak time and a non-peak time of the system capacity is large and a time change rate of the core node ratio in wireless communication system 100 for satisfying the required system capacity is large. For example, wireless communication system 100 can be used in facilities such as an office district, a stadium, a shopping district, a university campus, a theme park, and the like, as a usage example proper for the above-described case.

Wireless communication system 100 may be applied to a case (see FIG. 7) where it is desired to make an installation work of the wire backhaul zero. Specifically, a case where it is desired to form a service area (in other words, an Internet connection environment) where a wireless communication can be temporarily performed corresponds. For example, wireless communication system 100 can be used at a disaster site, for example, a short-term work site for approximately 10 days, and an event site.

As illustrated in FIG. 1, wireless communication system 100 includes a plurality of relay node base stations BS1, BS2, BS3, BS4, BS5, BS6, BS7, BS8, BS9, BS10, BS11, BS12, BS13, BS14, BS15, BS16, BS17, BS18, and BS19 (an example of a second base station or an external base station) relaying user data signals U (see FIG. 4) respectively transmitted from one or more accommodated terminals (for example, cellular phone GK, smartphone SM, and tablet terminal TB) through a wireless multi-hop communication. User data signal U includes, for example, video data captured by a monitoring camera as an example of a terminal. Wireless communication system 100 can perform a wireless communication of single-hop with any one relay node base station of the above-described relay node base stations BS1 to BS19, and includes true core node base stations CND1 and CND2 (an example of a third base station) capable of performing a wire communication with backbone networks CNW through wire backhauls LL1 and LL2.

Furthermore, it is characterized in that wireless communication system 100 includes quasi-core node base stations SCND1 and SCND2 (an example of a first base station) which can perform a wireless communication of single-hop with any relay node base station of the above-described relay node base stations BS1 to BS19 and can perform a wireless communication with backbone network CNW through wireless backhauls WBL1 and WBL2. As will be described below, quasi-core node base stations SCND1 and SCND2 can be adaptively switched to a first mode functioning as a true core node base station or a second mode functioning as a relay node base station so as to operate, in response to wireless multi-hop path signal S2 (see below description) generated based on a wireless environment.

In FIG. 1, relay node base stations BS1, BS2, BS3, and BS4 are communicably connected to true core node base station CND1 by a wireless multi-hop communication (for example, a wireless multi-hop communication using the wireless local area network (LAN) and the same applies hereinafter). In other words, relay node base stations BS1 to BS4 and true core node base station CND1 form a wireless multi-hop network, and the wireless multi-hop network is managed by true core node base station CND1.

Likewise, relay node base stations BS5, BS6, BS7, and BS8 are communicably connected to quasi-core node base station SCND1 by the wireless multi-hop communication. In other words, relay node base stations BS5 to BS8 and quasi-core node base station SCND1 form a wireless multi-hop network, and the wireless multi-hop network is managed by quasi-core node base station SCND1.

Likewise, relay node base stations BS9, BS10, BS11, BS12, BS13, BS14, BS15, BS16, and BS17 are communicably connected to true core node base station CND2 by the wireless multi-hop communication. In other words, relay node base stations BS9 to BS17 and true core node base station CND2 form a wireless multi-hop network, and the wireless multi-hop network is managed by true core node base station CND2.

Likewise, relay node base stations BS18 and BS19 are communicably connected to quasi-core node base station SCND2 by the wireless multi-hop communication. In other words, relay node base stations BS18 to BS19 and quasi-core node base station SCND2 form a wireless multi-hop network, and the wireless multi-hop network is managed by quasi-core node base station SCND2.

Relay node base station BS1 transmits user data signal U from a terminal accommodated by relay node base station BS2, user data signal U from a terminal accommodated by relay node base station BS3, and user data signal U from a terminal accommodated by relay node base station BS1 to true core node base station CND1 by the wireless multi-hop communication.

Relay node base station BS2 transmits user data signal U from the terminal accommodated by relay node base station BS2 to relay node base station BS1 by the wireless multi-hop communication.

Relay node base station BS3 transmits user data signal U from a terminal accommodated by relay node base station BS4 and user data signal U from the terminal accommodated by relay node base station BS3 to relay node base station BS1 by the wireless multi-hop communication.

Relay node base station BS4 transmits user data signal U from the terminal accommodated by relay node base station BS4 to relay node base station BS3 by the wireless multi-hop communication.

Relay node base station BS5 transmits user data signal U from a terminal accommodated by relay node base station BS5 to quasi-core node base station SCND1 by the wireless multi-hop communication.

Relay node base station BS6 transmits user data signal U from a terminal accommodated by relay node base station BS7 and user data signal U from a terminal accommodated by the relay node base station BS6 to quasi-core node base station SCND1 by the wireless multi-hop communication.

Relay node base station BS7 transmits user data signal U from a terminal accommodated by relay node base station BS8 and user data signal U from a terminal accommodated by relay node base station BS7 to relay node base station BS6 by the wireless multi-hop communication.

Relay node base station BS8 transmits user data signal U from the terminal accommodated by relay node base station BS8 to relay node base station BS7 by the wireless multi-hop communication.

Relay node base station BS9 transmits user data signal U from a terminal accommodated by relay node base station BS10 and user data signal U from a terminal accommodated by relay node base station BS9 to true core node base station CND2 by the wireless multi-hop communication.

Relay node base station BS10 transmits user data signal U from a terminal accommodated by relay node base station BS11 and user data signal U from the terminal accommodated by relay node base station BS10 to relay node base station BS9 by the wireless multi-hop communication.

Relay node base station BS11 transmits user data signal U from a terminal accommodated by relay node base station BS12 and user data signal U from the terminal accommodated by relay node base station BS11 to relay node base station BS10 by the wireless multi-hop communication.

Relay node base station BS12 transmits user data signal U from the terminal accommodated by relay node base station BS12 to relay node base station BS11 by the wireless multi-hop communication.

Relay node base station BS13 transmits user data signal U from the terminal accommodated by relay node base station BS14 and user data signal U from the terminal accommodated by relay node base station BS13 to true core node base station CND2 by the wireless multi-hop communication.

Relay node base station BS14 transmits user data signal U from the terminal accommodated by relay node base station BS14 to relay node base station BS13 by the wireless multi-hop communication.

Relay node base station BS15 transmits user data signal U from a terminal accommodated by relay node base station BS16 and user data signal U from a terminal accommodated by relay node base station BS15 to true core node base station CND2 by the wireless multi-hop communication.

Relay node base station BS16 transmits user data signal U from a terminal accommodated by relay node base station BS17 and user data signal U from the terminal accommodated by relay node base station BS16 to relay node base station BS15 by the wireless multi-hop communication.

Relay node base station BS17 transmits user data signal U from the terminal accommodated by relay node base station BS17 to relay node base station BS16 by the wireless multi-hop communication.

Relay node base station BS18 transmits user data signal U from a terminal accommodated by relay node base station BS19 and user data signal U from a terminal accommodated by relay node base station BS18 to quasi-core node base station SCND2 by the wireless multi-hop communication.

Relay node base station BS19 transmits user data signal U from the terminal accommodated by relay node base station BS19 to relay node base station BS18 by the wireless multi-hop communication.

Details of internal configurations of quasi-core node base stations SCND1 and SCND2 are the same as each other and will be described below with reference to FIG. 4. Details of internal configurations of true core node base stations CND1 and CND2 are the same as each other and will be described below with reference to FIG. 5. Details of internal configurations of relay node base stations BS1 to BS19 are the same as one another and will be described below with reference to FIG. 6. FIG. 1 illustrates an example in which wireless communication system 100 includes 19 relay node base stations, two true core node base stations, and two quasi-core node base stations, but this makes the description easy to understand, and the number of stations assigned to the quasi-core node base stations, the true core node base stations, and the relay node base station is not limited to this.

Relay node base stations BS1 to BS19 relay user data signals U from one or more terminals (for example, cellular phone GK, smartphone SM, and tablet terminal TB) becoming an accommodation target. That is, relay node base stations BS1 to BS19 transmit user data signals U to be relayed to communication partners determined by backbone network CNW sides (see FIG. 4) when establishing paths of the wireless multi-hop networks to which the related relay node base stations belong.

Wire lines such as optical fibers are provided as the backhaul (line) between true core node base stations CND1 and CND2 and backbone network CNW. User data signal U transmitted to and received from a terminal through an access line of a base station (specifically, the true core node base station, the quasi-core node base station, or the relay node base station) in wireless communication system 100 is transmitted to and received from backbone network CNW through the wire backhaul (line) of the true core node base station or a wireless backhaul line of the quasi-core node base station which will be described below. True core node base stations CND1 and CND2 are connected to backbone network CNW on an upstream side and are connected to the relay node base stations on a downstream side. True core node base stations CND1 and CND2 accommodate terminals on the access line side in the same manner as the relay node base station.

The backhauls (lines) are provided between quasi-core node base stations SCND1 and SCND2 and backbone network CNW by wireless lines of, for example, a millimeter wave band, a quasi-millimeter wave band, or a microwave band. User data signal U transmitted to and received from the terminal through the access line of the base station (specifically, the true core node base station, the quasi-core node base station, or the relay node base station) in wireless communication system 100 is transmitted to and received from backbone network CNW through the wire backhaul (line) of the true core node base station or the wireless backhaul (line) of the quasi-core node base station. As will be described below, quasi-core node base stations SCND1 and SCND2 have two modes of a mode (an example of a first mode) in which a function thereof is set as the (true) core node base station and a mode (an example of a second mode) in which the function thereof is set as the relay node base station. However, when a current operation mode is the first mode, quasi-core node base stations SCND1 and SCND2 are connected to backbone network CNW on the upstream side and are connected to the relay node base stations on the downstream side. Meanwhile, when the current operation mode is the second mode, quasi-core node base stations SCND1 and SCND2 are connected to the relay node base stations both on the upstream side and on the downstream side. Quasi-core node base stations SCND1 and SCND2 accommodate the terminals on the access line side in the same manner as the relay node base station.

Quasi-core node base stations SCND1 and SCND2 are adaptively switched to the first mode functioning as the true core node base station or to the second mode functioning as the relay node base station in response to wireless multi-hop path signal S2 (see below description) transmitted from backbone network CNW so as to operate. An example is illustrated in which quasi-core node base stations SCND1 and SCND2 of FIG. 1 operate in the first mode (that is, the true core node base station that wirelessly communicates with backbone network CNW through the wireless backhaul).

Backbone network CNW is a network (for example, the Internet) that enables a high-speed data wire communication through wire backhauls LL1 and LL2 such as an optical line using an optical fiber. Backbone network CNW is a network that enables a high-speed data wireless communication through wireless backhauls WBL1 and WBL2 of the millimeter wave band, the quasi-millimeter wave band, or the microwave band described above. This is based on a possibility that long term evolution (LTE) of the microwave band or a 5G frequency band of the microwave band may be adopted to the wireless backhaul.

Here, a wireless single hop communication (hereinafter, may be abbreviated as a "single hop") and a wireless multi-hop communication (hereinafter, may be abbreviated as a "multi-hop") used in wireless communication system 100 according to the first embodiment will be briefly described. The single hop and the multi-hop have a concept that is mutually opposed. The single hop indicates that a single relay node base station does not receive the user data signals from other relay node base stations and performs a direct data transfer by one hop (that is, a relay of one-time data transfer and the like) with the true core node base station or the quasi-core node base station. Meanwhile, the multi-hop indicates that data is transferred between the relay node base stations or between the relay node base station and the true core node base station or the quasi-core node base station by multi-hop (that is, relay of a plurality of times of data transfer and the like). For example, a communication between relay node base station BS2 and true core node base station CND1 is performed by the multi-hop, and a communication between relay node base station BS1 and true core node base station CND1 is performed by the single hop. In the base stations of each type configuring wireless communication system 100, maximum transfer distances of wireless links (wireless links that become a configuration element of the wireless multi-hop) between the base stations and the base stations are equal to each other. A distance of the wireless backhaul (this is a wireless link having no multi-hop between the quasi-core node base station and backbone network CNW) may be different from the above-described wireless link (the wireless link between the base station and the base station), and thus, if it is necessary to increase the maximum transfer distance, a wireless standard capable of doing so may be adopted.

Figure 2:
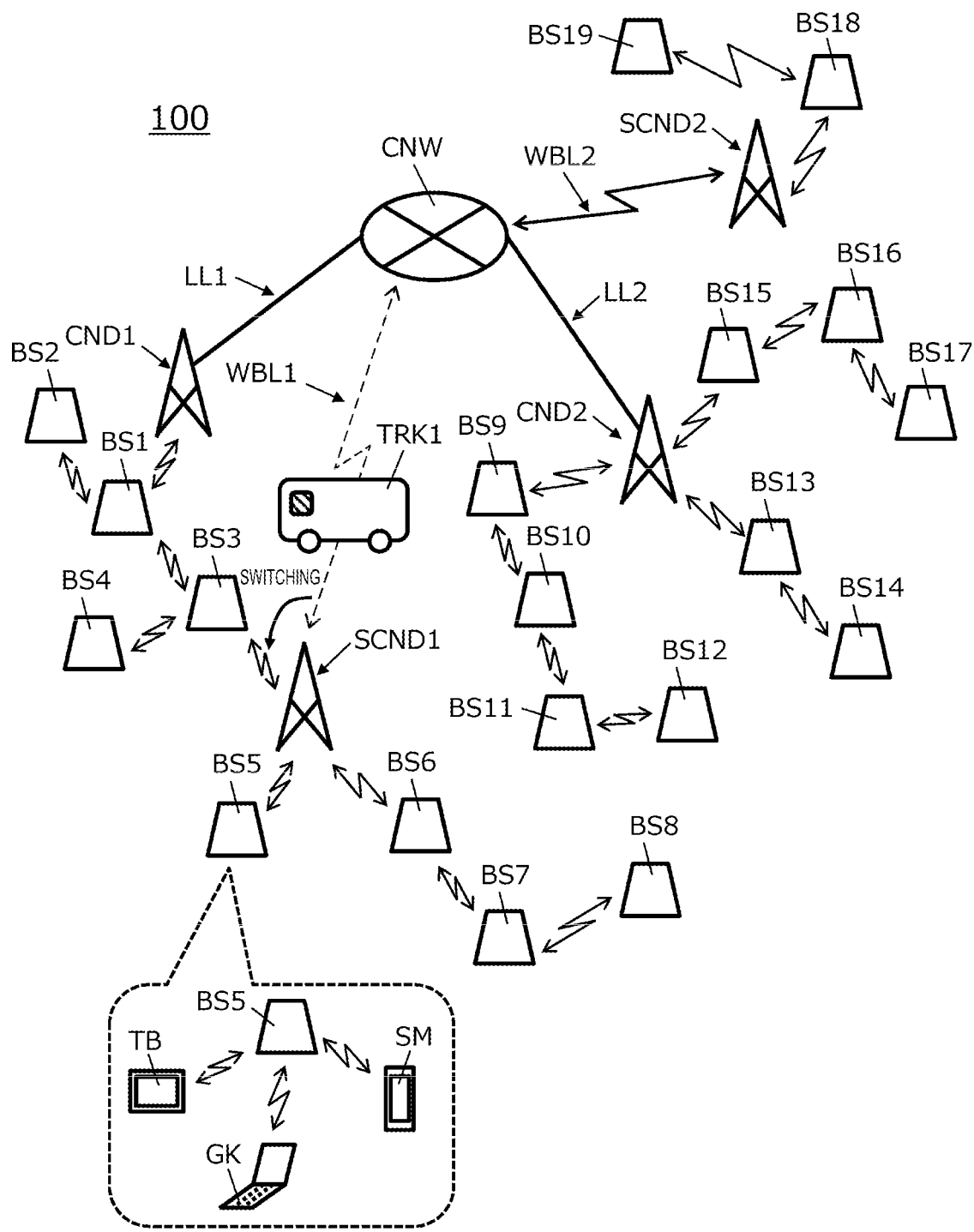
FIG. 2 is a diagram illustrating a system configuration example of the wireless communication system according to the first embodiment.
Figure 3:
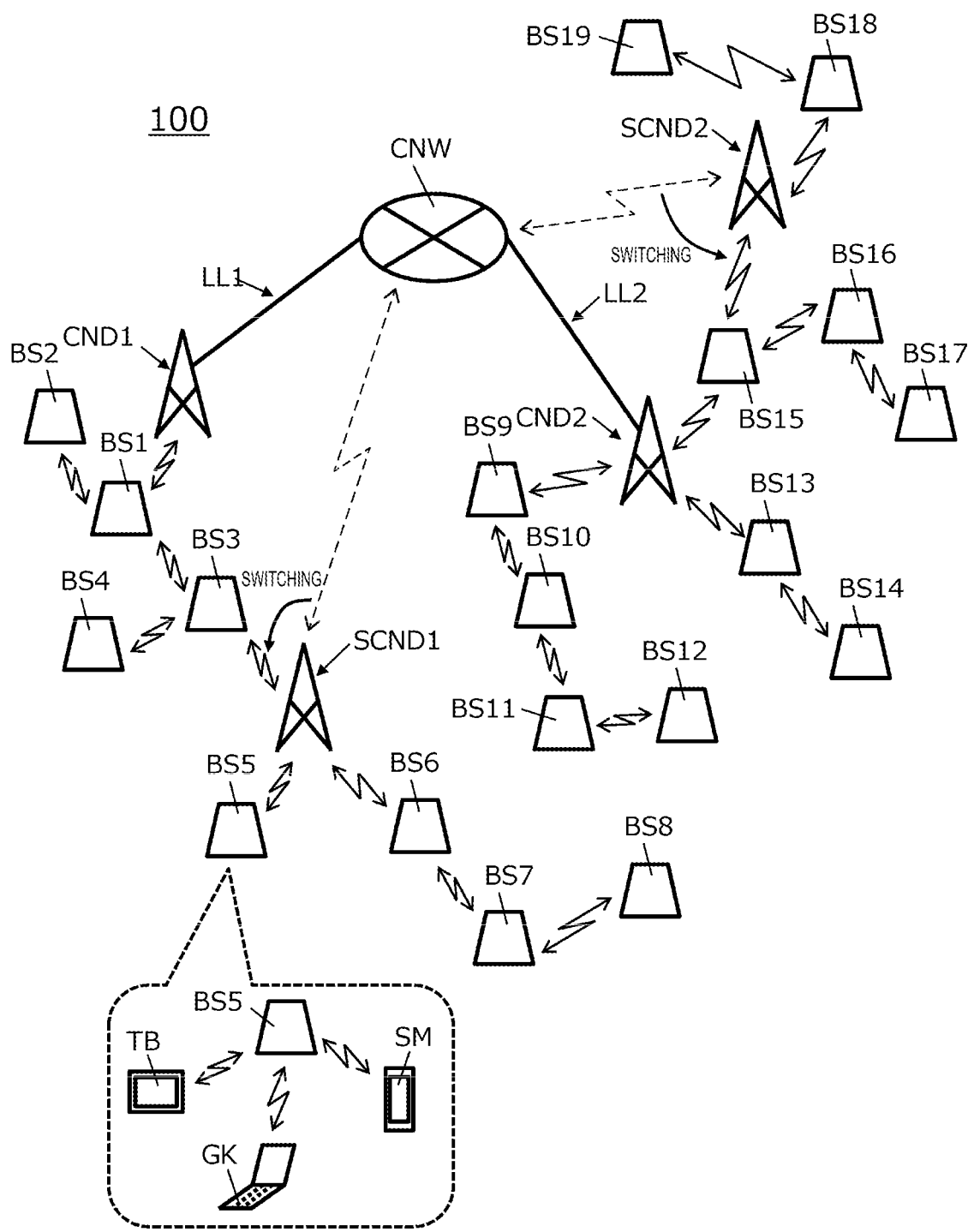
FIG. 3 is a diagram illustrating a system configuration example of the wireless communication system according to the first embodiment.

FIGS. 2 and 3 are diagrams illustrating system configuration examples of wireless communication system 100 according to the first embodiment. In description of FIG. 2 and FIG. 3, description on contents overlapping the description of FIG. 1 is omitted, and different contents are described.

FIG. 2 illustrates an example in which a shielding object such as large-sized truck TRK1 intrudes for a short time or stays for a long time in a propagation path between quasi-core node base station SCND1 and backbone network CNW. As described above, quasi-core node base station SCND1 can perform a high-speed data wireless communication with backbone network CNW through wireless backhaul WBL1 of a millimeter wave band or a quasi-millimeter wave band. However, when wireless backhaul WBL1 employs a wireless communication of the millimeter wave band or the quasi-millimeter wave band having a large wave propagation loss due to insertion of the shielding object, if the shielding object such as large-sized track TRK1 intrudes into or stays in the propagation path, a propagation attenuation amount of the wave increases, and a line quality of wireless backhaul WBL1 is reduced considerably. As a result, for example, a throughput (bps) is significantly reduced. Accordingly, the wireless environment suitable for performing a data wireless communication through wireless backhaul WBL1 between quasi-core node base station SCND1 and backbone network CNW is not formed. However, if a reflection path such as a building exists, a propagation attenuation amount of the wave does not necessarily increase and a line quality is not significantly reduced due to the intrusion of the shielding object.

In the first embodiment, when a line quality of wireless backhaul WBL1 between quasi-core node base station SCND1 and backbone network CNW is less than a predetermined value (specified value), for example, due to intrusion of a shielding object such as large-sized track TRK1, quasi-core node base station SCND1 reports such a state to backbone network CNW. Quasi-core node base station SCND1 switches a current operation mode from the first mode (function of the true core node base station) to the second mode (function of the relay node base station) in response to wireless multi-hop path signal S2 transmitted from backbone network CNW. For example, quasi-core node base station SCND1 is connected to relay node base station BS3 located closest in the periphery thereof (in other words, peripheral base station wireless line quality signal S1 is the best) by the wireless multi-hop communication.

Meanwhile, when the line quality of wireless backhaul WBL1 between quasi-core node base station SCND1 and backbone network CNW is greater than or equal to the predetermined value (specified value), for example, due to no existence of a shielding object such as large-sized track TRK1, quasi-core node base station SCND1 reports such a state to backbone network CNW. Quasi-core node base station SCND1 switches the current operation mode from the second mode (function of the relay node base station) to the first mode (function of the true core node base station) in response to wireless multi-hop path signal S2 transmitted from backbone network CNW. For example, quasi-core node base station SCND1 constructs wireless backhaul WBL1 and is connected to backbone network CNW by wireless backhaul WBL1.

FIG. 3 illustrates an example in which a function switching signal of intentional quasi-core node base station SCND1 or SCND2 is input to backbone network CNW, for example, by an operation of a system operator or a system administrator of backbone network CNW. It is conceivable that such a function switching signal is input due to the following reason. For example, when wireless backhauls WBL1 and WBL2 are configured by using a 5G wireless line or the like provided by an existing cellular communication carrier, there will be a payment of communication charges (that is, charges to a cellular communication carrier) according to a communication traffic amount on a wireless backhaul link will be made. Accordingly, in a situation (for example, an office street on a holiday, a shopping street in the early morning or at night, a university campus) where there is room even if the core node ratio is lower than a demand (for example, the amount of traffic to be accommodated) for system capacity of wireless backhaul, the amount of communication traffic in a link of wireless backhauls WBL1 and WBL2 is reduced, and thereby, there is a possibility that a system operator of wireless communication system 100 can reduce a system operation cost, and as a result, can reduce a communication charge of a user of the terminal.

In the first embodiment, wireless multi-hop path signal S2 including information to change the modes of quasi-core node base stations SCND1 and SCND2 to the second mode (function of the relay node base station) is transmitted from backbone network NCW to quasi-core node base stations SCND1 and SCND2 in response to the above-described function switching signal. In this case, quasi-core node base stations SCND1 and SCND2 switch the current operation mode from the first mode (function of the true core node base station) to the second mode (function of the relay node base station) in response to wireless multi-hop path signal S2 transmitted from backbone network CNW. For example, quasi-core node base station SCND1 is connected to relay node base station BS3 located closest in the periphery thereof (in other words, peripheral base station wireless line quality signal S1 is the best) by the wireless multi-hop communication. Likewise, quasi-core node base station SCND2 is connected to relay node base station BS15 located closest in the periphery thereof (in other words, peripheral base station wireless line quality signal S1 is the best) by the wireless multi-hop communication.

Next, specific hardware configuration examples will be described in the order of quasi-core node base station 10, true core node base station 20, and relay node base station 30 with reference to FIG. 4, FIG. 5, and FIG. 6, respectively.

Figure 4:
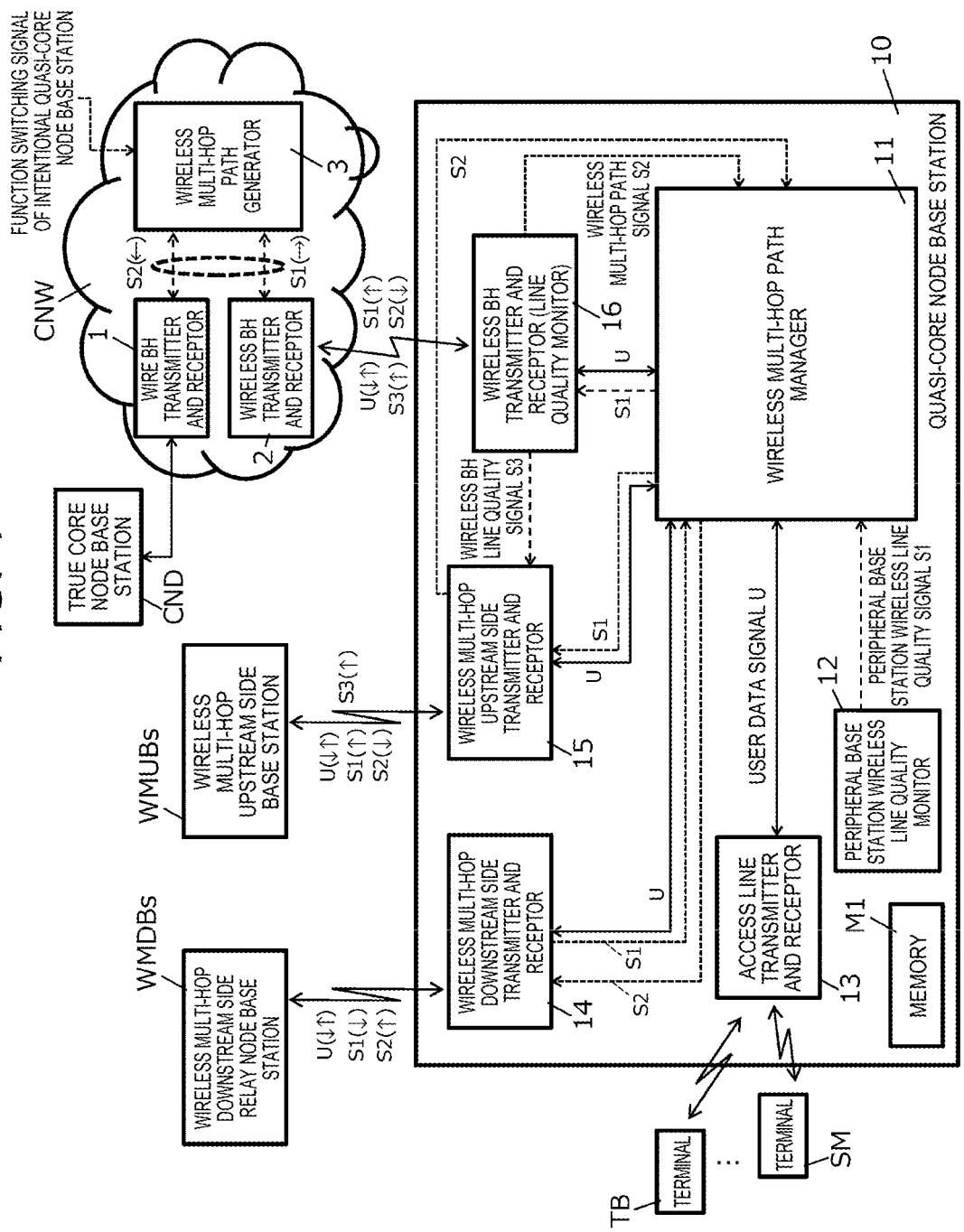
FIG. 4 is a block diagram illustrating a hardware configuration example of a quasi-core node base station according to the first embodiment.

FIG. 4 is a block diagram illustrating the hardware configuration example of quasi-core node base station 10 according to the first embodiment. Quasi-core node base station 10 as an example of the first base station is configured to include memory M1, wireless multi-hop path manager 11, peripheral base station wireless line quality monitor 12, access line transmitter and receptor 13, wireless multi-hop downstream side transmitter and receptor 14, wireless multi-hop upstream side transmitter and receptor 15, and wireless backhaul transmitter and receptor 16. In FIGS. 4 and 5, the backhaul is abbreviated as "BH" for the sake of convenience. Quasi-core node base station 10 illustrated in FIG. 4 corresponds to each of quasi-core node base stations SCND1 and SCND2 illustrated in FIGS. 1 to 3.

Memory M1 is configured by using, for example, a random access memory (RAM) and a read only memory (ROM), and a program specifying an operation of quasi-core node base station 10 is stored in the ROM. Memory M1 is also used as a work memory when performing processing such as various calculations in each unit of quasi-core node base station 10.

Wireless multi-hop path manager 11 is configured by using a processor (for example, a central processing unit (CPU) or a field programmable gate array (FPGA)). Wireless multi-hop path manager 11 receives and outputs user data signal U, peripheral base station wireless line quality signal S1, wireless multi-hop path signal S2, and wireless backhaul line quality signal S3 from and to each unit in quasi-core node base station 10.

Wireless multi-hop path manager 11 as an example of a controller manages a current operation mode of quasi-core node base station 10 in response to wireless multi-hop path signal S2 from wireless multi-hop upstream side transmitter and receptor 15 or wireless backhaul transmitter and receptor 16. For example, wireless multi-hop path manager 11 switches the current operation mode from the first mode (function of the core node base station) to the second mode (function of the relay node base station) in response to wireless multi-hop path signal S2, and in contrast to this, switches the current operation mode from the second mode (function of the relay node base station) to the first mode (function of the core node base station).

Peripheral base station wireless line quality monitor 12 as an example of a second measurer performs a constant monitoring while measuring a quality of wireless lines between quasi-core node base station and one or more relay node base stations (an example of external base stations) in the vicinity of quasi-core node base station 10. Peripheral base station wireless line quality monitor 12 transmits peripheral base station wireless line quality signal S1 (an example of a second quality measurement result) as a measurement result to wireless multi-hop path manager 11. Peripheral base station wireless line quality signal S1 includes identification information of quasi-core node base station 10 that performs the measurement.

Access line transmitter and receptor 13 uses an access line to communicate with one or more terminals (for example, cellular phone GK, smartphone SM, and tablet terminal TB illustrated in FIG. 1) that quasi-core node base station 10 uses as an accommodation target. Access line transmitter and receptor 13 receives user data signal U transmitted from the terminal and transmits the user data signal to wireless multi-hop path manager 11 or transmits user data signal U from wireless multi-hop path manager 11 to the terminal.

Wireless multi-hop downstream side transmitter and receptor 14 as an example of a second communicator is connected wireless multi-hop downstream side relay node base station WMDBs by the wireless multi-hop and performs a wireless communication therewith. In the example of FIG. 1, wireless multi-hop downstream side relay node base station WMDBs for quasi-core node base station SCND1 becomes relay node base stations BS5 and BS6. Wireless multi-hop downstream side transmitter and receptor 14 transmits user data signal U from wireless multi-hop path manager 11 to wireless multi-hop downstream side relay node base station WMDBs, or transmits user data signal U from wireless multi-hop downstream side relay node base station WMDBs to wireless multi-hop path manager 11. Wireless multi-hop downstream side transmitter and receptor 14 receives peripheral base station wireless line quality signal S1 transmitted from wireless multi-hop downstream side relay node base station WMDBs and transmits the peripheral base station wireless line quality signal to wireless multi-hop path manager 11. Wireless multi-hop downstream side transmitter and receptor 14 transmits wireless multi-hop path signal S2 from wireless multi-hop path manager 11 to wireless multi-hop downstream side relay node base station WMDBs.

Wireless multi-hop upstream side transmitter and receptor 15 as an example of the second communicator is connected to wireless multi-hop upstream side base station WMUBs by the wireless multi-hop and performs a wireless communication therewith. In the example of FIGS. 2 and 3, wireless multi-hop upstream side base station WMUBs for quasi-core node base station SCND1 becomes relay node base station BS3, but the wireless multi-hop upstream side base station is limited to being the relay node base station depending on the wireless multi-hop path and may be a true core node base station or may be a quasi-core node base station. Wireless multi-hop upstream side transmitter and receptor 15 transmits user data signal U from wireless multi-hop path manager 11 to wireless multi-hop upstream side base station WMUBs or transmits user data signal U from wireless multi-hop upstream side base station WMUBs to wireless multi-hop path manager 11. Wireless multi-hop upstream side transmitter and receptor 15 receives wireless multi-hop path signal S2 transmitted from wireless multi-hop upstream side base station WMUBs and transmits the wireless multi-hop path signal to wireless multi-hop path manager 11. Wireless multi-hop upstream side transmitter and receptor 15 transmits peripheral base station wireless line quality signal S1 from wireless multi-hop path manager 11 to wireless multi-hop upstream side base station WMUBs. Wireless multi-hop upstream side transmitter and receptor 15 also transmits wireless backhaul line quality signal S3 from wireless backhaul transmitter and receptor 16 to wireless multi-hop upstream side base station WMUBs.

Wireless backhaul transmitter and receptor 16 as an example of a first measurer performs a constant monitoring while measuring a quality of a wireless line of the wireless backhaul and is connected to backbone network CNW by the wireless backhaul to perform a wireless communication therewith. Wireless backhaul transmitter and receptor 16 as an example of the first communicator transmits wireless backhaul line quality signal S3 (an example of a first quality measurement result) as a measurement result to wireless multi-hop upstream side transmitter and receptor 15 or transmits the wireless backhaul line quality signal to backbone network CNW through the wireless backhaul. Wireless backhaul line quality signal S3 includes identification information of quasi-core node base station 10 that performed the measurement. Wireless backhaul transmitter and receptor 16 transmits user data signal U from wireless multi-hop path manager 11 to backbone network CNW, or transmits user data signal U from backbone network CNW to wireless multi-hop path manager 11. Wireless backhaul transmitter and receptor 16 transmits peripheral base station wireless line quality signal S1 from wireless multi-hop path manager 11 to backbone network CNW through the wireless backhaul. Wireless backhaul transmitter and receptor 16 transmits wireless multi-hop path signal S2 from backbone network CNW to wireless multi-hop path manager 11.

Backbone network CNW is configured to include wire backhaul transmitter and receptor 1, wireless backhaul transmitter and receptor 2, and wireless multi-hop path generator 3.

Wire backhaul transmitter and receptor 1 is connected to true core node base station CND (see true core node base stations CND1 and CND2 in the example of FIG. 1) through the wire backhaul. Wire backhaul transmitter and receptor 1 receives peripheral base station wireless line quality signal S1 from true core node base station CND and transmits the peripheral base station wireless line quality signal to wireless multi-hop path generator 3. Wire backhaul transmitter and receptor 1 transmits wireless multi-hop path signal S2 from wireless multi-hop path generator 3 to true core node base station CND.

Wireless backhaul transmitter and receptor 2 is connected to quasi-core node base station 10 (see quasi-core node base stations SCND1 and SCND2 in the example of FIG. 1) through the wireless backhaul and performs a wireless communication therewith. Wireless backhaul transmitter and receptor 2 receives peripheral base station wireless line quality signal S1 from quasi-core node base station 10 and transmits the peripheral base station wireless line quality signal to wireless multi-hop path generator 3. Wireless backhaul transmitter and receptor 2 transmits wireless multi-hop path signal S2 from wireless multi-hop path generator 3 to quasi-core node base station 10.

Wireless multi-hop path generator 3 constantly generates or updates wireless multi-hop path signal S2 (an example of a path signal), based on peripheral base station wireless line quality signals S1 measured by each of all the base stations included in wireless communication system 100 and wireless backhaul line quality signal S3 measured by each of all quasi-core node base stations 10 included in wireless communication system 100. For example, wireless multi-hop path generator 3 generates an appropriate wireless multi-hop path for connecting all the base stations configuring wireless communication system 100 by the wireless multi-hop by using peripheral base station wireless line quality signal S1 and wireless backhaul line quality signal S3. Wireless multi-hop path generator 3 receives function switching signals of intentional quasi-core node base stations SCND1 and SCND2 by an operation of an operator or a manager of backbone network CNW. Wireless multi-hop path generator 3 may generate wireless multi-hop path signal S2 in addition to the function switching signal.

Figure 5:
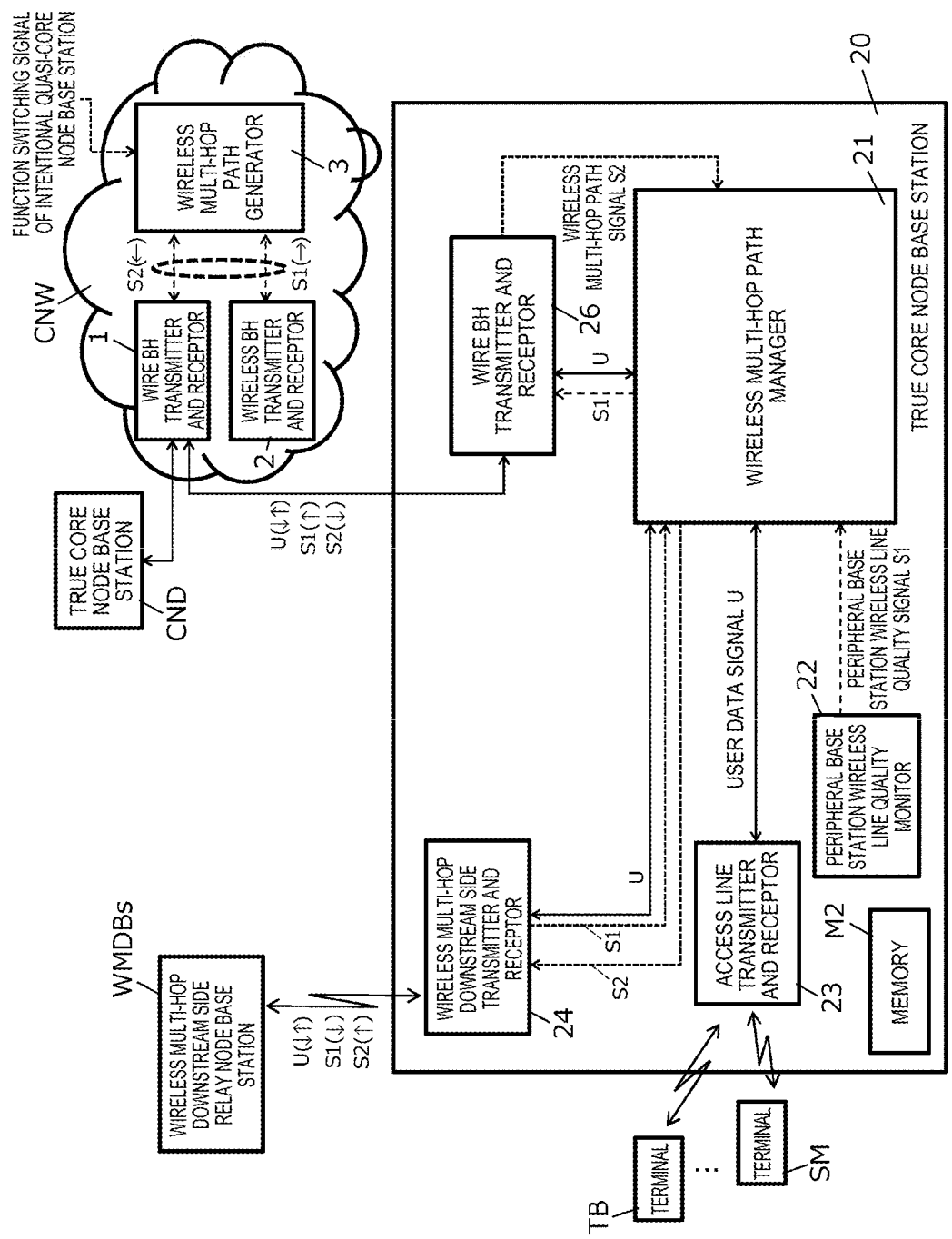
FIG. 5 is a block diagram illustrating a hardware configuration example of a true core node base station according to the first embodiment.

FIG. 5 is a block diagram illustrating a hardware configuration example of true core node base station 20 according to the first embodiment. True core node base station 20 as an example of the third base station is configured to include memory M2, wireless multi-hop path manager 21, peripheral base station wireless line quality monitor 22, access line transmitter and receptor 23, wireless multi-hop downstream side transmitter and receptor 24, and wire backhaul transmitter and receptor 26. True core node base stations 20 illustrated in FIG. 5 correspond to true core node base stations CND1 and CND2 illustrated in FIGS. 1 to 3, respectively. In description of FIG. 5, the same configurations as those in FIG. 4 will be denoted by the same reference numerals or symbols and description thereof will be simplified or omitted, and other contents will be described.

Memory M2 is configured by using, for example, a RAM and a ROM, and a program specifying an operation of true core node base station 20 is stored in the ROM. Memory M2 is also used as a work memory when performing processing such as various calculations in each unit of true core node base station 20.

Wireless multi-hop path manager 21 is configured by using a processor (for example, a CPU or an FPGA). Wireless multi-hop path manager 21 receives or outputs user data signal U, peripheral base station wireless line quality signal S1, and wireless multi-hop path signal S2 from or to each unit in true core node base station 20.

Peripheral base station wireless line quality monitor 22 performs a constant monitoring while measuring quality of the wireless line between the peripheral base station wireless line quality monitor and one or more relay node base stations (an example of an external base station) around true core node base station 20. Peripheral base station wireless line quality monitor 22 transmits peripheral base station wireless line quality signal S1 as a measurement result to wireless multi-hop path manager 21. Peripheral base station wireless line quality signal S1 includes identification information of true core node base station 20 that performed the measurement.

Access line transmitter and receptor 23 performs a communication by using access lines between the access line transmitter and receptor and one or more terminals (for example, cellular phone GK, smartphone SM, and tablet terminal TB illustrated in FIG. 1) which become an accommodation target of true core node base station 20. Access line transmitter and receptor 23 receives user data signal U transmitted from the terminal and transmits the user data signal to wireless multi-hop path manager 21, or transmits user data signal U from wireless multi-hop path manager 21 to the terminal.

Wireless multi-hop downstream side transmitter and receptor 24 is connected to the wireless multi-hop downstream side relay node base station WMDBs by wireless multi-hop and performs a wireless communication therewith. In the example of FIG. 1, wireless multi-hop downstream side relay node base station WMDBs for true core node base station CND1 becomes relay node base station BS1. Wireless multi-hop downstream side transmitter and receptor 24 transmits user data signal U from wireless multi-hop path manager 21 to wireless multi-hop downstream side relay node base station WMDBs, or transmits user data signal U from wireless multi-hop downstream side relay node base station WMDBs to wireless multi-hop path manager 21. Wireless multi-hop downstream side transmitter and receptor 24 receives peripheral base station wireless line quality signal S1 transmitted from wireless multi-hop downstream side relay node base station WMDBs and transmits the peripheral base station wireless line quality signal to wireless multi-hop path manager 21. Wireless multi-hop downstream side transmitter and receptor 24 transmits wireless multi-hop path signal S2 from wireless multi-hop path manager 21 to wireless multi-hop downstream side relay node base station WMDBs.

Wire backhaul transmitter and receptor 26 is connected to backbone network CNW by the wire backhaul and performs a wire communication therewith. Wire backhaul transmitter and receptor 26 transmits user data signal U from wireless multi-hop path manager 21 to backbone network CNW, or transmits user data signal U from backbone network CNW to wireless multi-hop path manager 21. Wire backhaul transmitter and receptor 26 transmits peripheral base station wireless line quality signal S1 from wireless multi-hop path manager 21 to backbone network CNW through the wire backhaul. Wire backhaul transmitter and receptor 26 transmits wireless multi-hop path signal S2 from backbone network CNW to wireless multi-hop path manager 21.

In backbone network CNW, wire backhaul transmitter and receptor 1 is connected to true core node base stations CND and 20 through the wire backhaul and performs a wire communication therewith. Wire backhaul transmitter and receptor 1 receives peripheral base station wireless line quality signal S1 from true core node base stations CND and 20 and transmits the peripheral base station wireless line quality signal to wireless multi-hop path generator 3. Wire backhaul transmitter and receptor 1 transmits wireless multi-hop path signal S2 from wireless multi-hop path generator 3 to true core node base stations CND and 20.

Figure 6:
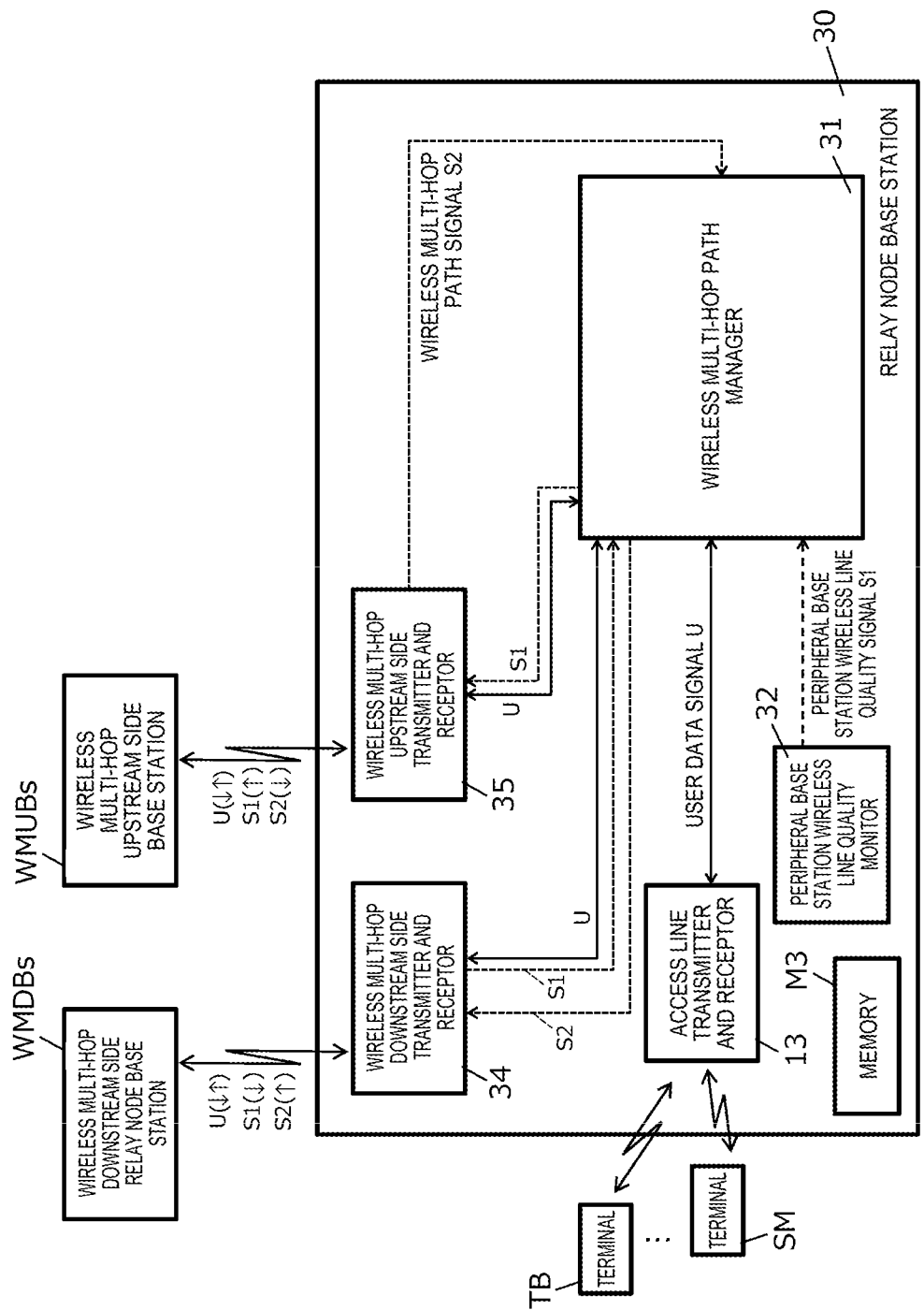
FIG. 6 is a block diagram illustrating a hardware configuration example of a relay node base station according to the first embodiment.

FIG. 6 is a block diagram illustrating a hardware configuration example of relay node base station 30 according to the first embodiment. Relay node base station 30 as an example of a second base station is configured to include memory M3, wireless multi-hop path manager 31, peripheral base station wireless line quality monitor 32, access line transmitter and receptor 33, wireless multi-hop downstream side transmitter and receptor 34, and wireless multi-hop upstream side transmitter and receptor 35. Relay node base stations 30 illustrated in FIG. 6 correspond to relay node base stations BS1 to BS19 illustrated in FIGS. 1 to 3, respectively. In description of FIG. 6, the same components as those in FIG. 4 are denoted by the same reference numerals or symbols and description thereof will be simplified or omitted, and other contents will be described.

Memory M3 is configured by using, for example, a RAM and a ROM, and a program specifying an operation of relay node base station 30 is stored in the ROM. Memory M3 is also used as a work memory when performing processing such as various calculations in each unit of relay node base station 30.

Wireless multi-hop path manager 31 is configured by using a processor (for example, a CPU or an FPGA). Wireless multi-hop path manager 31 receives or outputs user data signal U, peripheral base station wireless line quality signal S1, and wireless multi-hop path signal S2 from or to each unit of relay node base station 30.

Peripheral base station wireless line quality monitor 32 performs a constant monitoring while measuring a quality of wireless lines to one or more relay node base stations (an example of the external base station), around relay node base station 30, true core node base station 20, and quasi-core node base station 10. Peripheral base station wireless line quality monitor 32 transmits peripheral base station wireless line quality signal S1 as a measurement result to wireless multi-hop path manager 31. Peripheral base station wireless line quality signal S1 includes identification information of relay node base station 30 that performed the measurement.

Access line transmitter and receptor 33 uses an access line to communicate with one or more terminals (for example, cellular phone GK, smartphone SM, and tablet terminal TB illustrated in FIG. 1) that become an accommodation target of relay node base station 30. Access line transmitter and receptor 33 receives user data signal U transmitted from the terminal and transmits the user data signal to wireless multi-hop path manager 31, or transmits user data signal U from wireless multi-hop path manager 31 to the terminal.

The wireless multi-hop downstream side transmitter and receptor 34 is connected to wireless multi-hop downstream side relay node base station WMDBs by the wireless multi-hop and performs a wireless communication therewith. In the example of FIG. 1, wireless multi-hop downstream side relay node base station WMDBs for relay node base station BS3 becomes relay node base station BS4. Wireless multi-hop downstream side transmitter and receptor 34 transmits user data signal U from wireless multi-hop path manager 31 to wireless multi-hop downstream side relay node base station WMDBs or transmits user data signal U from wireless multi-hop downstream side relay node base station WMDBs to wireless multi-hop path manager 31. Wireless multi-hop downstream side transmitter and receptor 34 receives peripheral base station wireless line quality signal S1 transmitted from wireless multi-hop downstream side relay node base station WMDBs and transmits peripheral base station wireless line quality signal to wireless multi-hop path manager 31. Wireless multi-hop downstream side transmitter and receptor 34 transmits wireless multi-hop path signal S2 from wireless multi-hop path manager 31 to wireless multi-hop downstream side relay node base station WMDBs.

Wireless multi-hop upstream side transmitter and receptor 35 is connected to wireless multi-hop upstream side base station WMUBs by the wireless multi-hop and performs a wireless communication therewith. In the example of FIG. 1, wireless multi-hop upstream side base station WMUBs for relay node base station BS3 becomes relay node base station BS1, but wireless multi-hop upstream side base station is not limited to the wireless multi-hop path by the wireless multi-hop path and may be a true core node base station or a quasi-core node base station. Wireless multi-hop upstream side transmitter and receptor 35 transmits user data signal U from wireless multi-hop path manager 31 to wireless multi-hop upstream side base station WMUBs or transmits user data signal U from wireless multi-hop upstream side base station WMUBs to wireless multi-hop path manager 31. Wireless multi-hop upstream side transmitter and receptor 35 receives wireless multi-hop path signal S2 transmitted from wireless multi-hop upstream side base station WMUBs and transmits the wireless multi-hop path signal to wireless multi-hop path manager 31. Wireless multi-hop upstream side transmitter and receptor 35 transmits peripheral base station wireless line quality signal S1 from wireless multi-hop path manager 31 to wireless multi-hop upstream side base station WMUBs.

Figure 7:
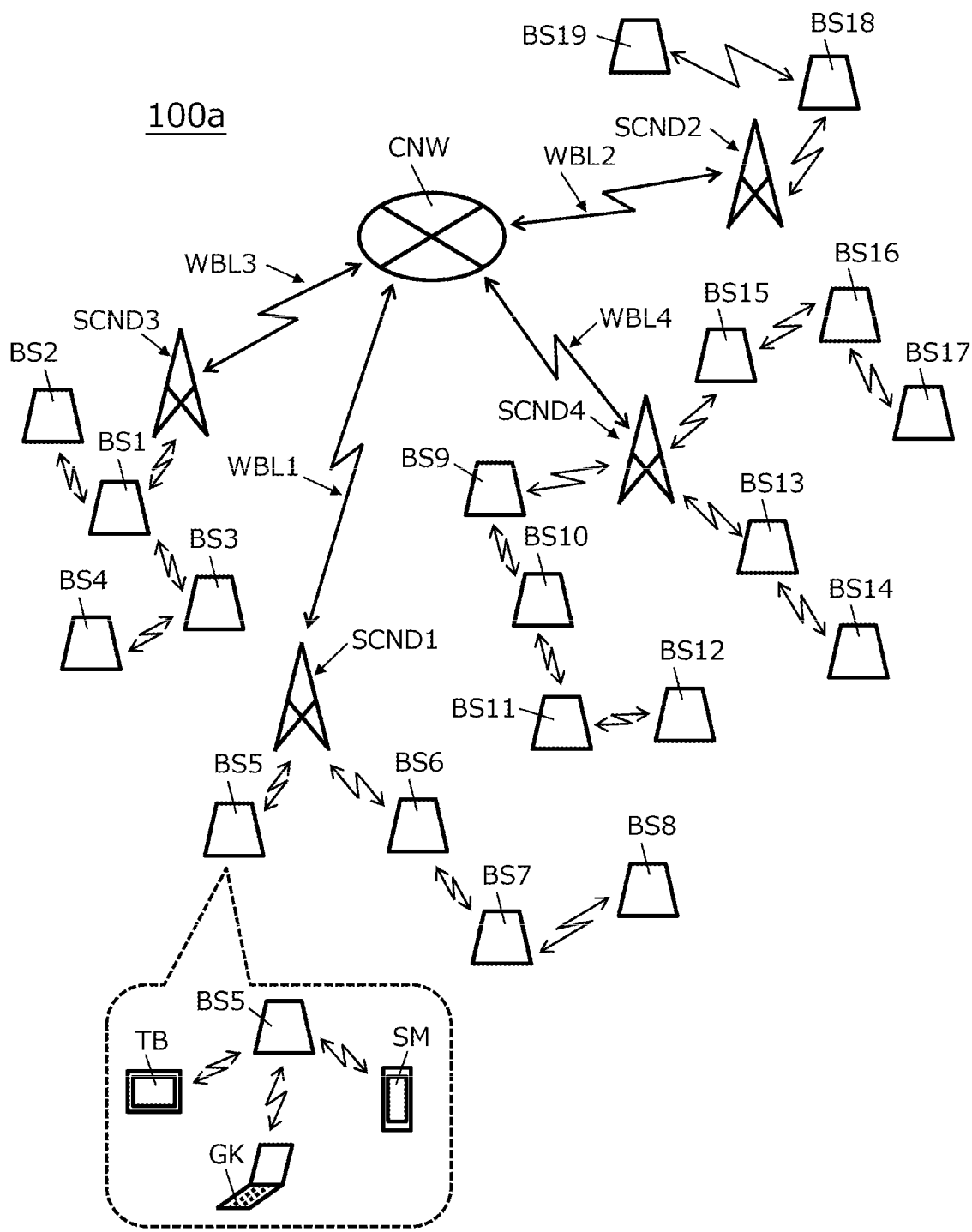
FIG. 7 is a diagram illustrating a system configuration example of the wireless communication system according to the first embodiment.

As illustrated in FIG. 7, in wireless communication system 100a according to the first embodiment, true core node base station 20 may be omitted as a base station connected to backbone network CNW. FIG. 7 is a diagram illustrating a system configuration example of wireless communication system 100a according to the first embodiment. In description of FIG. 7, description on contents overlapping the description of FIG. 1 will be omitted, and other contents will be described.

A difference between wireless communication system 100a illustrated in FIG. 7 and wireless communication system 100 illustrated in FIG. 1 is the number of installed true core node base stations. In the wireless communication system 100a of FIG. 7, the number of installed true core node base stations is zero, and instead of true core node base stations CND1 and CND2 of FIG. 1, quasi core node base stations SCND3 and SCND4 are installed. Quasi-core node base station SCND3 is connected to backbone network CNW through wireless backhaul WBL3 and performs a data wireless communication therewith. Likewise, quasi-core node base station SCND4 is connected to backbone network CNW through wireless backhaul WBL4 and performs a data wireless communication therewith.

As described above, a use case to which the wireless communication system according to the first embodiment is applied includes a use case where a service area (in other words, a connection environment of the Internet) where a temporal wireless communication is possible, such as a disaster site, for example, a short-term work site for approximately 10 days, an event site, or the like. Even in such a use case, by adopting a configuration of wireless communication system 100a illustrated in FIG. 7, an installation work of the wire backhaul may not be required, and thus, a simple system configuration is possible, and it is expected that convenience of the system operator or a system administrator is properly improved.

Operation of Wireless Communication System

Figure 8:
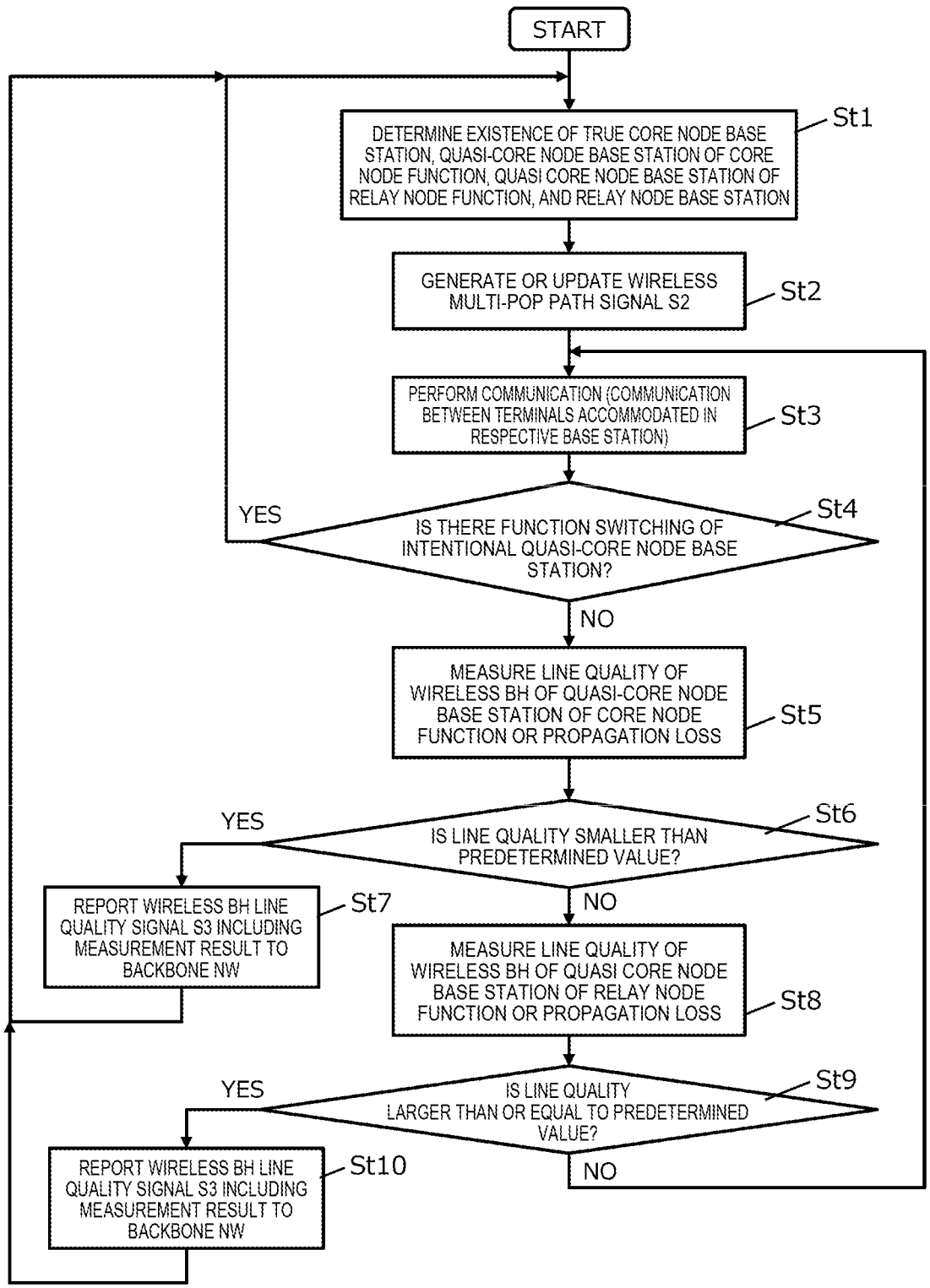
FIG. 8 is a flowchart illustrating an operation sequence example of the wireless communication system according to the first embodiment.
Figure 9:
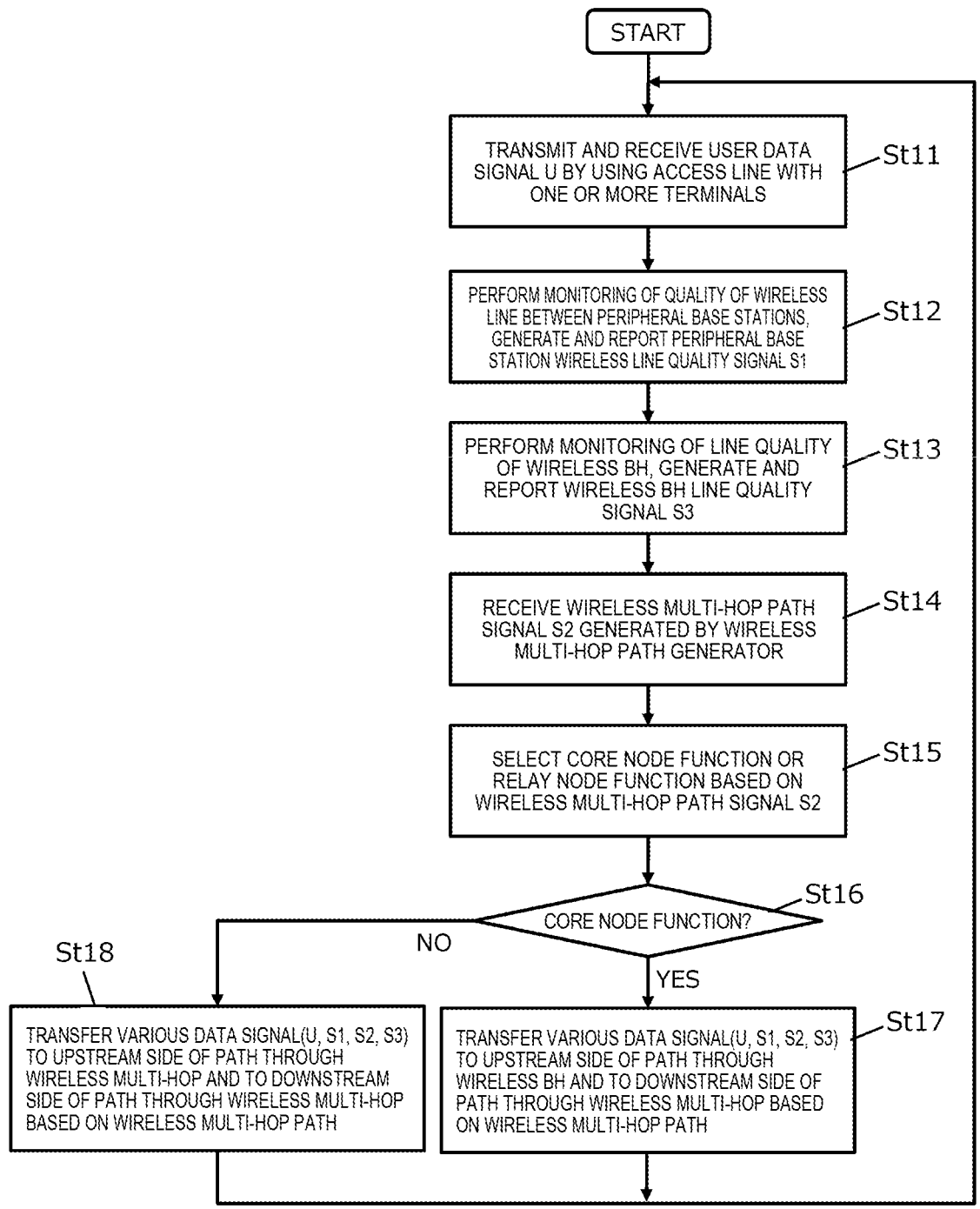
FIG. 9 is a flowchart illustrating an operation sequence example of the quasi-core node base station according to the first embodiment.

Next, an operation of wireless communication system 100 according to the first embodiment will be described with reference to FIGS. 8 and 9. FIG. 8 is a flowchart illustrating an operation sequence example of wireless communication system 100 according to the first embodiment. FIG. 9 is a flowchart illustrating an operation sequence example of quasi-core node base station 10 according to the first embodiment.

In FIG. 8, wireless multi-hop path generator 3 of backbone network CNW determines existence of various base stations (for example, the true core node base station, the quasi-core node base station of a core node function, the quasi core node base station of a relay node function, and the relay node base station) configuring wireless communication system 100 (St1). Wireless multi-hop path generator 3 generates (constructs) or updates wireless multi-hop path signal S2, based on peripheral base station wireless line quality signal S1 and wireless backhaul line quality signal S3 transmitted from the various base stations configuring wireless communication system 100 (St2). Thereby, quasi-core node base station 10 is switched to the first mode (a function of the core node base station) or switched to the second mode (a function of the relay node base station) in response to wireless multi-hop path signal S2 generated or updated in step St2. In order to make the description easy to understand, it is assumed that processing of step St2 causes quasi-core node base station 10 in the first mode (the function of the core node base station) and quasi-core node base station 10 in the second mode (the function of the relay node base station) to co-exist.

In wireless communication system 100, transmission and reception of user data signal U are made between the respective base stations (for example, the true core node base station, the quasi core node base station of the core node function, the quasi core node base station of the relay node function, and the relay node base station) and terminals accommodated in the respective base stations (St3).

Here, it is determined whether or not a function switching signal of intentional quasi-core node base station 10 is input to wireless multi-hop path generator 3 by an operation of a system manager or a system administrator (St4). When it is determined that the function switching signal of intentional quasi-core node base station 10 is input to wireless multi-hop path generator 3 (St4, YES), an operation of wireless communication system 100 returns to step St1. That is, wireless multi-hop path signal S2 is generated by wireless multi-hop path generator 3 such that a mode of quasi-core node base station 10 is switched to the second mode (the function of the relay mode base station).

Meanwhile, when it is determined that the function switching signal of intentional quasi-core node base station 10 is not input to wireless multi-hop path generator 3 (St4, NO), wireless multi-hop path generator 3 does not regenerate wireless multi-hop path signal S2 and the operation of wireless communication system 100 proceeds to step St5.

Quasi-core node base station 10 in the first mode (the function of the core node base station) measures a quality of a wireless line of the wireless backhaul or a propagation loss of a radio wave and generates wireless backhaul line quality signal S3 corresponding to the measurement result (St5). Quasi-core node base station 10 in the first mode (the function of the core node base station) determines whether or not the measurement result (line quality) included in wireless backhaul line quality signal S3 is smaller than a predetermined value (specified value) (St6). When it is determined that the measurement result included in wireless backhaul line quality signal S3 is not smaller than the predetermined value (St6, NO), processing of the wireless communication system 100 proceeds to step St8.

Meanwhile, when it is determined that the measurement result included in wireless backhaul line quality signal S3 is smaller than the predetermined value (St6, YES), quasi-core node base station 10 in the first mode (the function of the core node base station) reports wireless backhaul line quality signal S3 generated in step St5 to wireless multi-hop path generator 3 of backbone network NW (St7). After step St7, the processing of wireless communication system 100 returns to step St1. That is, wireless multi-hop path signal S2 is generated by wireless multi-hop path generator 3 such that the mode of quasi-core node base station 10 is switched to the second mode (the function of the relay mode base station).

Quasi-core node base station 10 in the second mode (the function of the relay node base station) measures the quality of the wireless line of the wireless backhaul or the propagation loss of the radio wave, and generates wireless backhaul line quality signal S3 corresponding to the measurement result (St8). Quasi-core node base station 10 in the second mode (the function of the relay node base station) determines whether or not the measurement result (a line quality) included in wireless backhaul line quality signal S3 is larger than or equal to the predetermined value (specified value) (St9). When it is determined that the measurement result included in wireless backhaul line quality signal S3 is not larger than or equal to the predetermined value (St9, NO), the processing of wireless communication system 100 returns to step St3. That is, a current wireless multi-hop path is maintained unchanged and a communication is performed at each base station.

Meanwhile, when it is determined that the measurement result included in wireless backhaul line quality signal S3 is larger than or equal to the predetermined value (St9, YES), quasi-core node base station 10 in the second mode (the function of the relay node base station) reports wireless backhaul line quality signal S3 generated in step St8 to wireless multi-hop path generator 3 of backbone network NW (St10). After step St10, the processing of wireless communication system 100 returns to step St1. That is, wireless multi-hop path signal S2 is generated by wireless multi-hop path generator 3 such that the mode of the quasi-core node base station 10 is switched to the first mode (the function of the core node base station).

In FIG. 9, quasi-core node base station 10 performs a communication of user data signal U by using an access line with one or more terminals (for example, cellular phone GK, smartphone SM, and tablet terminal TB illustrated in FIG. 1) which become an accommodation target of the quasi-core node base station (St11).

Quasi-core node base station 10 performs a constant monitoring while measuring quality of a wireless line between the quasi-core node base station and one or more relay node base stations 30 around the quasi-core node base station, generates peripheral base station wireless line quality signal S1 as the measurement result, and reports the peripheral base station wireless line quality signal to wireless multi-hop path generator 3 of backbone network CNW (St12).

Quasi-core node base station 10 performs a constant monitoring while measuring the quality of the wireless line of the wireless backhaul, generates wireless backhaul line quality signal S3 as the measurement result, and reports the wireless backhaul line quality signal to wireless multi-hop path generator 3 of backbone network CNW (St13).

Quasi-core node base station 10 receives wireless multi-hop path signal S2 generated by wireless multi-hop path generator 3 of backbone network CNW (St14), and a current operation mode is switched from the first mode (the function of the core node base station) to the second mode (the function of the relay node base station) in response to the wireless multi-hop path signal S2, and conversely, is switched from the second mode (the function of the relay node base station) to the first mode (the function of the core node base station) (St15).

After step St15, when it is determined that a current mode is the first mode (the function of the core node base station) (St16, YES), quasi-core node base station 10 transfers various data signals to an upstream side of a path through the wireless backhaul, based on a wireless multi-hop path included in wireless multi-hop path signal S2, and transfers the various data signals to a downstream side of the path through the wireless multi-hop (St17).

Meanwhile, when it is determined that the current mode is the second mode (the function of the relay node base station) (St16, NO), quasi-core node base station 10 also transfers the various data signals to both the upstream side and the downstream side of the path through the wireless multi-hop, based on the wireless multi-hop path included in the wireless multi-hop path signal S2 (St18).

As described above, wireless communication system 100 according to the first embodiment includes at least one quasi-core node base station 10 connectable to backbone network CNW by a wireless backhaul, quasi-core node base station 10, and wireless multi-hop path generator 3 generating a wireless multi-hop path including one or more relay node base stations 30 connected to quasi-core node base station 10 by the wireless multi-hop. Quasi-core node base station 10 reports wireless backhaul line quality signal S3 indicating a line quality of the wireless backhaul, and peripheral base station wireless line quality signal S1 indicating quality of a line between the quasi-core node base station and relay node base station 30 disposed around quasi-core node base station 10 to wireless multi-hop path generator 3. Wireless multi-hop path generator 3 generates wireless multi-hop path signal S2 indicating the wireless multi-hop path and transmits the wireless multi-hop path signal to quasi-core node base station 10, based on wireless backhaul line quality signal S3 and peripheral base station wireless line quality signal S1 transmitted from quasi-core node base station 10. Quasi-core node base station 10 is switched to a first mode connected by the wireless backhaul between the quasi-core node base station and backbone network CNW, or a second mode connected by the wireless multi-hop between the quasi-core node base station and relay node base stations 30 disposed therearound in response to wireless multi-hop path signal S2.

Figure 10:
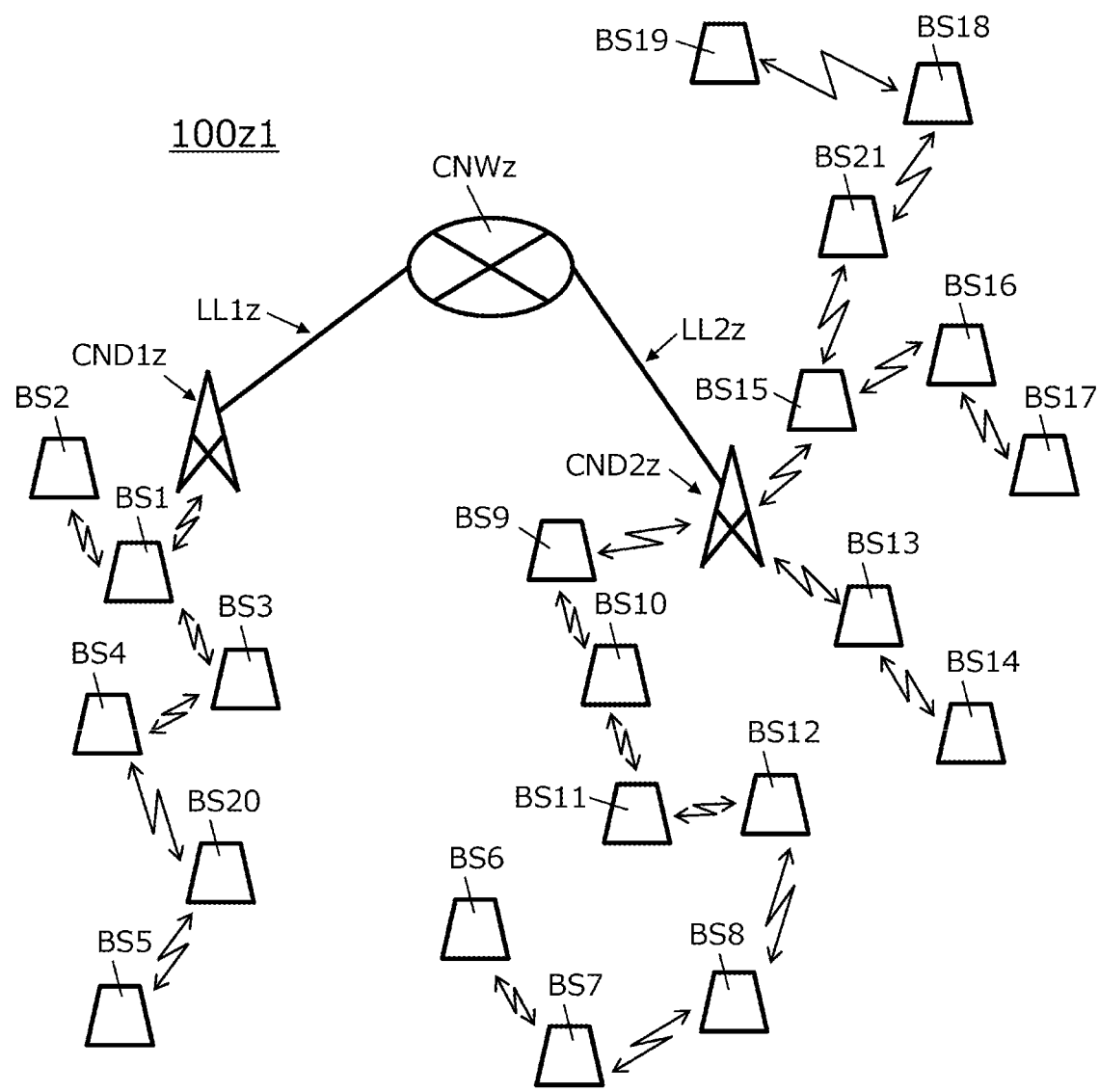
FIG. 10 is a diagram illustrating a system configuration example of a wireless communication system according to a first related art.
Figure 11:
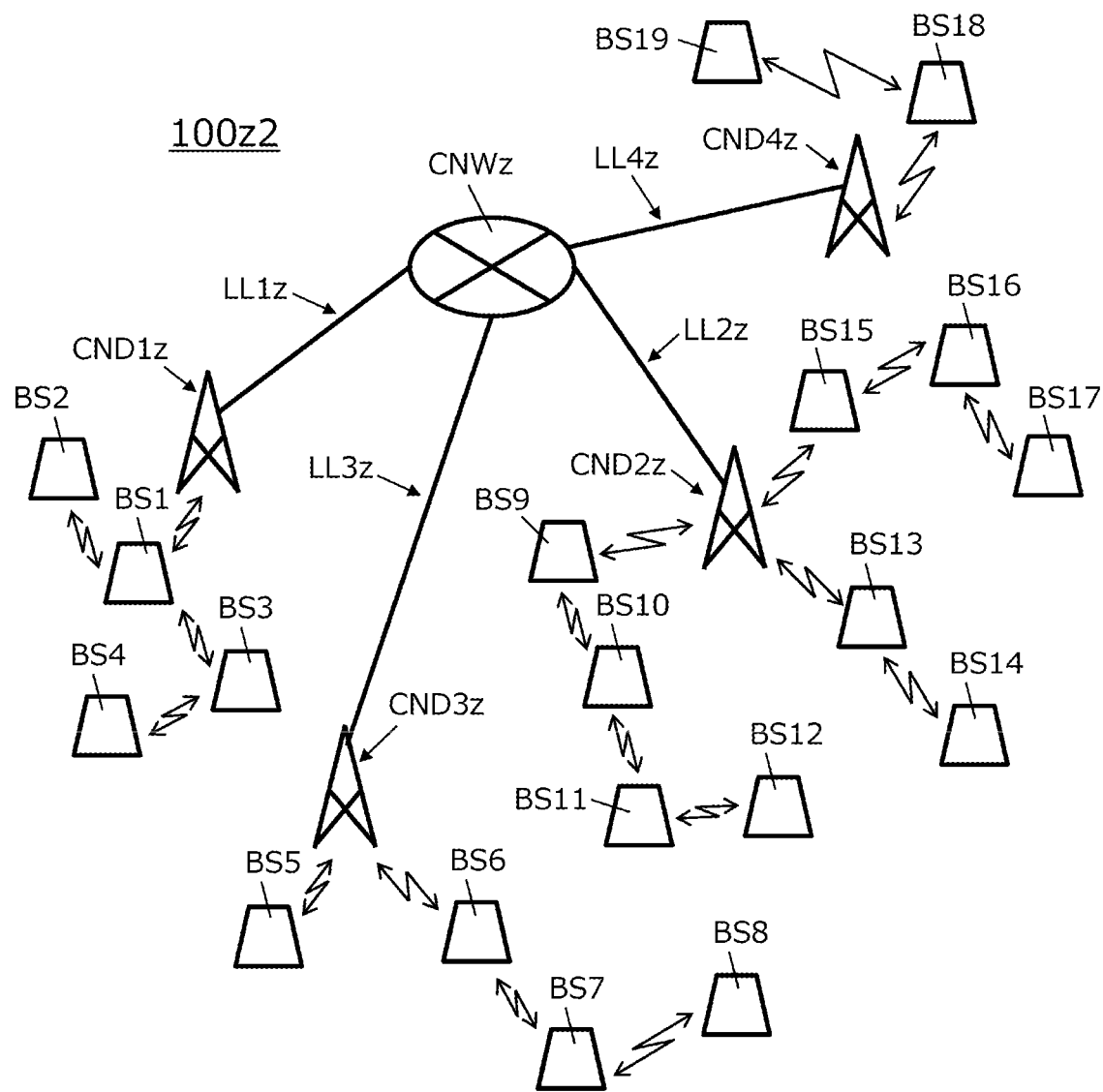
FIG. 11 is a diagram illustrating a system configuration example of a wireless communication system according to a second related art.

Here, a difference between wireless communication system 100 according to the first embodiment and wireless communication systems 100z1 and 100z2 according to related art will be described with reference to FIGS. 10 and 11. FIG. 10 is a diagram illustrating a system configuration example of wireless communication system 100z1 according to a first related art. FIG. 11 is a diagram illustrating a system configuration example of wireless communication system 100z2 according to a second related art.

In wireless communication system 100z1 according to the related art illustrated in FIG. 10 and wireless communication system 100 according to the first embodiment illustrated in FIG. 1, the total number of installed base stations (total 23 stations) is the same, and types of the installed base stations are different from each other. For example, in FIG. 10, quasi-core node base station 10 according to the first embodiment is not installed, the number of installed core node base stations $CND1z$ and $CND2z$ connected to backbone network $CNWz$ by wire backhauls $LL1z$ and $LL2z$ is "2", and the number of installed relay node base stations BS1 to BS19, BS20, and BS21 connected to any of the core node base stations by the wireless multi-hop is "21". Meanwhile, for example, in FIG. 1, the number of installed true core node base station 20 is "2", the number of installed quasi-core node base stations 10 is "2", and the number of installed relay node base stations 30 is "19". That is, since the number of installed relay node base stations is reduced in wireless communication system 100 according to the first embodiment as compared with wireless communication system 100z1 of the related art illustrated in FIG. 10, reduction in system capacity that can be accommodated by a relay node base station group of wireless communication system 100 is suppressed to a certain extent.

In wireless communication system 100z2 of the related art illustrated in FIG. 11 and wireless communication system 100 according to the first embodiment illustrated in FIG. 1, the total number of installed base stations (total 23 stations) is the same, and types of the installed base stations are different from each other. For example, in FIG. 11, quasi-core node base station 10 according to the first embodiment is not installed, the number of installed core node base stations $CND1z$, $CND2z$, $CND3z$, and $CND4z$ connected to backbone network $CNWz$ by wire backhauls is "4", and the number of installed relay node base stations BS1 to BS19 connected to any of the core node base stations by the wireless multi-hop is "19". Meanwhile, for example, in FIG. 1, the number of installed true core node base station 20 is "2", the number of installed quasi-core node base stations 10 is "2", and the number of installed relay node base stations 30 is "19". That is, since the number of installed true core node base stations is reduced in wireless communication system 100 according to the first embodiment as compared with wireless communication system 100z2 of the related art illustrated in FIG. 11, a burden on an installation work of the wire backhaul in construction of wireless communication system 100 can be considerably reduced.

Thereby, wireless communication system 100 according to the first embodiment can adaptively switch an operation mode of quasi-core node base station 10 to either a function of the core node base station or a function of the relay node base station depending on each of a quality of a wireless line of the wireless backhaul and a quality of a wireless line to a peripheral base station. Thus, wireless communication system 100 can achieve both a reduction in installation of the backhaul line of a wire cable and suppression of a reduction in system capacity.

True core node base station 20 connected to backbone network CNW by the wire backhaul and connected to one or more relay node base stations 30 by the wireless multi-hop is further disposed on the wireless multi-hop path. Thereby, wireless communication system 100 stably transmits and receives user data signal U accommodated by each relay node base station 30 to and from backbone network CNW through true core node base station 20 connected to backbone network CNW by the wire backhaul between the wireless communication system and the backbone network.

Quasi-core node base station 10 switches a current operation mode to the second mode, based on wireless multi-hop path signal S2 transmitted from wireless multi-hop path generator 3 after reporting wireless backhaul line quality signal S3 including the measurement result smaller than the predetermined value. Thereby, even when a quality of the wireless line of the wireless backhaul is not good, such as when a shielding object such as large-sized truck TRK1 intrudes into a propagation path between quasi-core node base station 10 and backbone network CNW, quasi-core node base station 10 can adaptively operate as relay node base station 30 capable of wirelessly communicating with peripheral relay node base station 30 according to a situation by stopping a wireless communication with backbone network CNW.

In the second mode, quasi-core node base station 10 transmits a data signal to each of an upstream side and a downstream side of the wireless multi-hop path through the wireless multi-hop. Thereby, quasi-core node base station 10 performs a wireless multi-hop communication with peripheral relay node base station 30 on either the upstream side or the downstream side during the data wireless communication and performs a stable data wireless communication.

Quasi-core node base station 10 switches the current operation mode to the first mode, based on wireless multi-hop path signal S2 transmitted from wireless multi-hop path generator 3 after reporting wireless backhaul line quality signal S3 including the measurement result larger than or equal to the predetermined value. Thereby, quasi-core node base station 10 can resume a wireless communication with backbone network CNW through the wireless backhaul, when the quality of the wireless line of the wireless backhaul is well recovered, such as when there is no shielding object such as large-sized truck TRK1 existing in the propagation path between the quasi-core node base station and backbone network CNW.

In the first mode, quasi-core node base station 10 transmits user data signal U to the upstream side of the wireless multi-hop path through the wireless backhaul and transmits user data signal U to the downstream side of the wireless multi-hop path through the wireless multi-hop. Thereby, quasi-core node base station 10 can perform a stable data wireless communication with backbone network CNW or peripheral relay node base station 30 by using the wireless backhaul on the upstream side and using the wireless multi-hop communication on the downstream side during the data wireless communication.

Although the embodiments are described above with reference to the accompanying drawings, the present disclosure is not limited to such examples. It is obvious that those skilled in the art can derive various modification examples, an alteration example, a replacement example, an additional example, a removal example, and an equivalent example within the scope of the claims, which is understood to be also within the technical scope of the present disclosure. Configuration elements of the above-described embodiments may be combined variously within a range without departing from the spirit of the disclosure.

The present disclosure is useful as a wireless communication system, a wireless communication method, and a base station that adaptively switch a function of a core node base station or a function of a relay node base station according to each of a quality of a wireless line of a wireless backhaul and a quality of a wireless line to a peripheral base stations and achieve both a reduction in installation of a backhaul line of a wire cable and suppression of reduction in system capacity.

What is claimed is:

1. A wireless communication system comprising:
   at least one first base station connectable to a backbone network by a wireless backhaul; and
   a path generator generating a wireless multi-hop path including the first base station and one or more second base stations connected to the first base station by a wireless multi-hop, wherein
   the first base station reports, to the path generator, a first quality measurement result indicating a line quality of the wireless backhaul and a second quality measurement result indicating a line quality between the first base station and one of the one or more second base stations,
   the path generator generates a path signal based on the first quality measurement result and the second quality measurement result, and
   the first base station is switched, responsive to the path signal, to a first mode in which the first base station functions as a core node base station by being connected to the backbone network by the wireless backhaul, or to a second mode in which the first base station functions as a relay node base station by being connected to the one of the one or more second base stations by the wireless multi-hop.

2. The wireless communication system of claim 1,
   wherein the wireless multi-hop path further includes a third base station connected to the backbone network by a wire backhaul and connected to the one or more second base stations by the wireless multi-hop.

3. The wireless communication system of claim 1,
   wherein the first base station is switched to the second mode based on the path signal, which is transmitted from the path generator after the first base station reports the first quality measurement result that is smaller than a predetermined value.

4. The wireless communication system of claim 3,
   wherein the first base station, in the second mode, transmits data signals by the wireless multi-hop to both an upstream side and a downstream side of the wireless multi-hop path.

5. The wireless communication system of claim 1,
   wherein the first base station is switched to the first mode based on the path signal, which is transmitted from the path generator after the first base station reports the first quality measurement result that is larger than or equal to a predetermined value.

6. The wireless communication system of claim 5,
   wherein the first base station, in the first mode, transmits a data signal by the wireless backhaul to an upstream side of the wireless multi-hop path, and transmits a data signal by the wireless multi-hop to a downstream side of the wireless multi-hop path.

7. A wireless communication method in a wireless communication system including at least one first base station connectable to a backbone network by a wireless backhaul, and a path generator generating a wireless multi-hop path including the first base station and one or more second base stations connected to the first base station by a wireless multi-hop, the wireless communication method comprising:
   reporting, by the first base station to the path generator, a first quality measurement result indicating a line quality of the wireless backhaul and a second quality measurement result indicating a line quality between the first base station and one of the one or more second base stations;

generating, by the path generator, a path signal based on the first quality measurement result and the second quality measurement result; and switching the first base station, responsive to the path signal, to a first mode in which the first base station functions as a core node base station by being connected to the backbone network by the wireless backhaul, or to a second mode in which the first base station functions as a relay node base station by being connected to the one of the one or more second base stations by the wireless multi-hop.

8. The wireless communication method of claim 7, wherein the wireless multi-hop path further includes a third base station connected to the backbone network by a wire backhaul and connected to the one or more second base stations by the wireless multi-hop.

9. The wireless communication method of claim 7, wherein the first base station is switched to the second mode based on the path signal, which is transmitted from the path generator after the first base station reports the first quality measurement result that is smaller than a predetermined value.

10. The wireless communication method of claim 9, wherein the first base station, in the second mode, transmits data signals by the wireless multi-hop to both an upstream side and a downstream side of the wireless multi-hop path.

11. The wireless communication method of claim 7, wherein the first base station is switched to the first mode based on the path signal, which is transmitted from the path generator after the first base station reports the first quality measurement result that is larger than or equal to a predetermined value.

12. The wireless communication method of claim 11, wherein the first base station, in the first mode, transmits a data signal by the wireless backhaul to an upstream side of the wireless multi-hop path, and transmits a data signal by the wireless multi-hop to a downstream side of the wireless multi-hop path.

13. A base station connectable to a backbone network by a wireless backhaul, comprising:

a first communicator communicating with a path generator generating a wireless multi-hop path, which includes the base station and one or more external base stations connected to the base station by a wireless multi-hop;

a second communicator communicating with the one or more external base stations by the wireless multi-hop;

a first measurer measuring a first quality indicating a line quality of the wireless backhaul and reporting the first quality to the path generator;

a second measurer measuring a second quality indicating a line quality between the base station and one of the one or more external base stations and reporting the second quality to the path generator; and a controller performing switching, responsive to a path signal transmitted from the path generator based on the first quality and the second quality, to a first mode in which the base station functions as a core node base station by being connected to the backbone network by the wireless backhaul, or to a second mode in which the base station functions as a relay node base station by being connected to the one of the one or more external base stations by the wireless multi-hop.

14. The base station of claim 13, wherein the wireless multi-hop path further includes a third base station connected to the backbone network by a wire backhaul and connected to the one or more external base stations by the wireless multi-hop.

15. The base station of claim 13, wherein the controller switches to the second mode based on the path signal, which is transmitted from the path generator after the first measurer reports the first quality that is smaller than a predetermined value.

16. The base station of claim 15, which, in the second mode, transmits data signals by the wireless multi-hop to both an upstream side and a downstream side of the wireless multi-hop path.

17. The base station of claim 13, wherein the controller switches to the first mode based on the path signal, which is transmitted from the path generator after the first measurer reports the first quality that is larger than or equal to a predetermined value.

18. The base station of claim 17, which, in the first mode, transmits a data signal by the wireless backhaul to an upstream side of the wireless multi-hop path, and transmits a data signal by the wireless multi-hop to a downstream side of the wireless multi-hop path.

* * * * *